United States Patent
Honjo et al.

(10) Patent No.: US 8,427,574 B2
(45) Date of Patent: Apr. 23, 2013

(54) CAMERA BODY AND IMAGING DEVICE CONTROLLING DISPLAY BASED ON DETECTED MOUNTING STATE OF LENS

(75) Inventors: Kenichi Honjo, Osaka (JP); Hiroshi Ueda, Osaka (JP); Masato Murayama, Osaka (JP)

(73) Assignee: Panasonic Corporation, Osaka (JP)

( * ) Notice: Subject to any disclaimer, the term of this patent is extended or adjusted under 35 U.S.C. 154(b) by 149 days.

(21) Appl. No.: 13/062,723

(22) PCT Filed: Aug. 27, 2009

(86) PCT No.: PCT/JP2009/004164
§ 371 (c)(1),
(2), (4) Date: Mar. 8, 2011

(87) PCT Pub. No.: WO2010/029698
PCT Pub. Date: Mar. 18, 2010

(65) Prior Publication Data
US 2011/0164154 A1 Jul. 7, 2011

(30) Foreign Application Priority Data
Sep. 11, 2008 (JP) .................. 2008-233876

(51) Int. Cl.
*H04N 5/225* (2006.01)
(52) U.S. Cl.
USPC ................ 348/360; 348/374; 348/222.1
(58) Field of Classification Search .................. 348/340, 348/360, 333.01, 374, 222.1
See application file for complete search history.

(56) References Cited

U.S. PATENT DOCUMENTS

| 5,537,185 A * | 7/1996 | Ohishi et al. ............... 396/55 |
| 5,600,371 A | 2/1997 | Arai et al. |
| 2005/0212948 A1 * | 9/2005 | Watanabe et al. .......... 348/340 |
| 2006/0216023 A1 | 9/2006 | Tokiwa et al. |
| 2007/0166027 A1 * | 7/2007 | Misawa ...................... 396/529 |
| 2008/0088727 A1 | 4/2008 | Nagata et al. |
| 2008/0106616 A1 | 5/2008 | Nagata et al. |
| 2008/0111902 A1 | 5/2008 | Ogami |
| 2010/0110277 A1 * | 5/2010 | Shibuno et al. ............ 348/360 |

FOREIGN PATENT DOCUMENTS

| JP | 4-204638 | 7/1992 |
| JP | 5-333414 | 12/1993 |
| JP | 5-333417 | 12/1993 |
| JP | 2000-092374 | 3/2000 |
| JP | 2001-125173 | 5/2001 |

(Continued)

OTHER PUBLICATIONS

International Search Report of PCT Application No. PCT/JP2009/004164, dated Nov. 10, 2009.

*Primary Examiner* — Gevell Selby
(74) *Attorney, Agent, or Firm* — Panasonic Patent Center

(57) ABSTRACT

A camera body (3) comprises a housing (3a), a body mount (4), an imaging sensor (11), a display section (20), a mounting detector (10d), and an image display controller (21). The display section (20) is capable of displaying an image on the basis of an image signal acquired by the imaging sensor (11). The mounting detector (10d) is capable of detecting the mounting state of an interchangeable lens unit (2) with respect to the body mount (4). The image display controller (21) controls the display section (20) so that the mounting state of the display section (20) is switched on the basis of the detection result of the mounting detector (10d).

18 Claims, 19 Drawing Sheets

FOREIGN PATENT DOCUMENTS

| | | |
|---|---|---|
| JP | 2001-268427 | 9/2001 |
| JP | 2005-323289 | 11/2005 |
| JP | 2006-276469 | 10/2006 |
| JP | 2007-005912 | 1/2007 |
| JP | 2008-053846 | 3/2008 |
| JP | 2008-085433 | 4/2008 |
| JP | 2008-085434 | 4/2008 |
| JP | 2008-122534 | 5/2008 |
| JP | 2008-154158 | 7/2008 |

\* cited by examiner

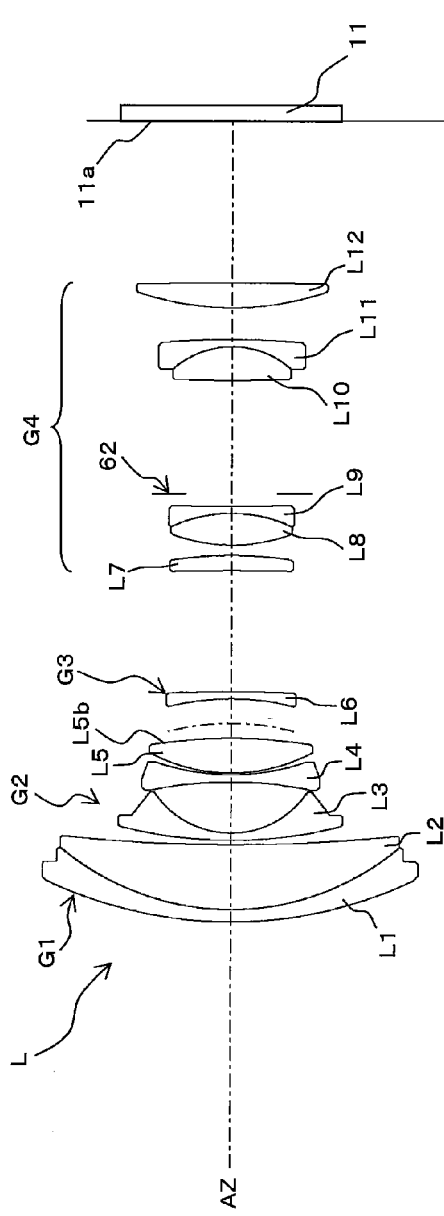
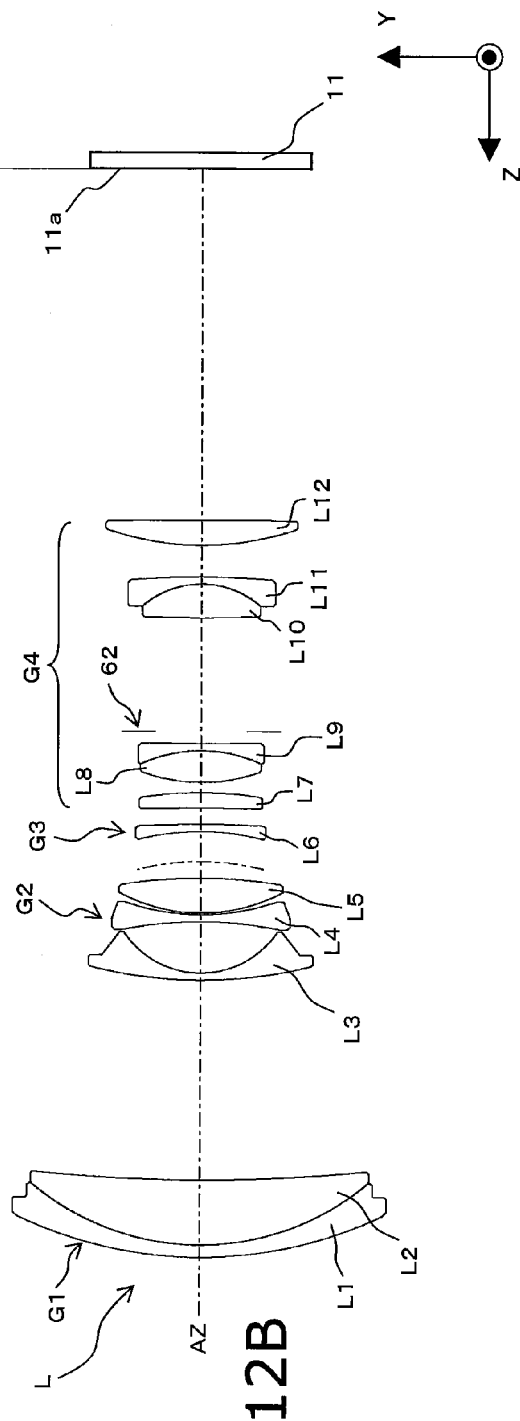
FIG. 12A
FIG. 12B

Please turn interchangeable lens clockwise until it clicks.

Mounting of interchangeable lens cannot be detected. Please press display button to display live image.

CAMERA BODY AND IMAGING DEVICE CONTROLLING DISPLAY BASED ON DETECTED MOUNTING STATE OF LENS

This U.S. National stage application claims priority under 35 U.S.C. §119(a) to Japanese Patent Application No. 2008-233876, filed in Japan on Sep. 11, 2008, the entire contents of which are hereby incorporated herein by reference.

TECHNICAL FIELD

The technology disclosed herein relates to a camera body used in an interchangeable lens type of imaging device.

BACKGROUND ART

Digital cameras and other such imaging devices have surged in popularity in recent years. One type of digital camera is an interchangeable lens type. For example, with this type of digital camera, when an optical viewfinder is used to observe a subject, the light incident on the optical system (that is, a subject image) is reflected by a quick return mirror disposed along the optical path, and is guided to a viewfinder optical system. As a result, the subject image is converted by a pentaprism or the like into an erect image, and guided to an optical viewfinder. Consequently, the user can look through the optical viewfinder to observe the subject image formed by the optical system.

Meanwhile, when an optical system is used for imaging, the quick return mirror is retracted from the imaging optical path. As a result, the viewfinder optical path is switched to the imaging optical path, and when the imaging is finished, the quick return mirror instantly returns to its original position. This method is employed in both conventional silver halide cameras and digital cameras, as long as they are single lens reflex cameras.

However, imaging with an optical viewfinder is extremely inconvenient for a novice who is inexperienced with digital camera photography.

In view of this, an imaging device has been proposed that has a monitor imaging mode (known as live view mode) in which the subject can be observed on a liquid crystal monitor during imaging (see Patent Literature 1, for example).

CITATION LIST

Patent Literature

Patent Literature 1: Japanese Laid-Open Patent Application 2001-125173
Patent Literature 2: Japanese Laid-Open Patent Application 2006-276469

SUMMARY

An interchangeable lens digital camera can take pictures using a variety of interchangeable lens units. When an interchangeable lens unit is replaced, the first one is removed from the camera body, and the second one is mounted to the camera body.

However, when an interchangeable lens unit is mounted to a camera body, for example, there is the risk that it will not be properly mounted, and it is conceivable that the digital camera will end up being used in a state in which the interchangeable lens unit has not been properly mounted to the camera body. It is particularly likely that a novice who is inexperienced with interchangeable lens digital cameras will not notice that the interchangeable lens unit has not been properly mounted to the camera body. This is undesirable because an image captured in a state in which the interchangeable lens unit has not been properly mounted to the camera body may not have the desired quality as compared to an image captured in a properly mounted state.

In view of this, an imaging device has been proposed in which the user is advised of the mounting state of the interchangeable lens unit (see Patent Literature 2, for example).

However, even with a constitution in which the user is advised of the mounting state, it is entirely possible that the user will take a picture without noticing that the interchangeable lens unit mounting state is incomplete.

It is one object of the technology disclosed herein to provide a camera body and an imaging device with which image capture is effectively prevented if the interchangeable lens unit has not been properly mounted.

A camera body disclosed herein allows the mounting of an interchangeable lens unit configured to form an optical image of a subject. This camera body comprises a housing, a mounting component, an imaging element, a display section, a mounting detector, and a display controller. The mounting component is fixed to the housing, and the interchangeable lens unit can be mounted to the mounting component. The imaging element is housed in the housing and is configured to convert an optical image of the subject into an image signal. The display section is configured to display the subject as an image on the basis of the image signal acquired by the imaging element. The mounting detector is configured to detect the mounting state of the interchangeable lens unit with respect to the mounting component. The display controller restricts the display of the subject as a live image on the display section when the mounting detector has detected that the mounting state of the interchangeable lens unit is incomplete.

The "mounting state of the interchangeable lens unit with respect to the mounting component" referred to here can be, for example, a state in which the interchangeable lens unit has been completely mounted to the mounting component, a state in which the interchangeable lens unit has been completely removed from the mounting component, or a state in which the interchangeable lens unit is in the midst of being mounted to the mounting component. The phrase "detecting the mounting state" encompasses the detection of the start and end of mounting, as well as the detection of the start and end of removal. The phrase "the mounting state of the interchangeable lens unit is incomplete" refers to a situation other than one in which the mounting state of the interchangeable lens unit is complete. Further, the term "live image" means a real-time image of a subject.

With this camera body, since the display controller restricts the subject from being displayed as a live image on the display section when the interchangeable lens unit is in an incompletely mounted state, the user cannot perform framing while looking at the display section if the mounting state of the interchangeable lens unit is incomplete. Therefore, accidental imaging when the interchangeable lens unit is in an incomplete mounting state can be more effectively prevented. Similarly, with an imaging device having this camera body, accidental imaging when the interchangeable lens unit is in an incomplete mounting state can be more effectively prevented.

The imaging device here can encompass devices capable of capturing only still pictures, devices capable of capturing only moving pictures, and devices capable of capturing both still and moving pictures. The display section can be a monitor on the rear of the camera and used in live view mode, or an EVF (electronic viewfinder) used in viewfinder imaging mode.

BRIEF DESCRIPTION OF DRAWINGS

FIG. 12A is a diagram of the configuration of an optical system (wide angle end), and FIG. 12B is a diagram of the configuration of an optical system (telephoto end);

DESCRIPTION OF EMBODIMENTS

First Embodiment

Summary of Digital Camera

Figure 1:
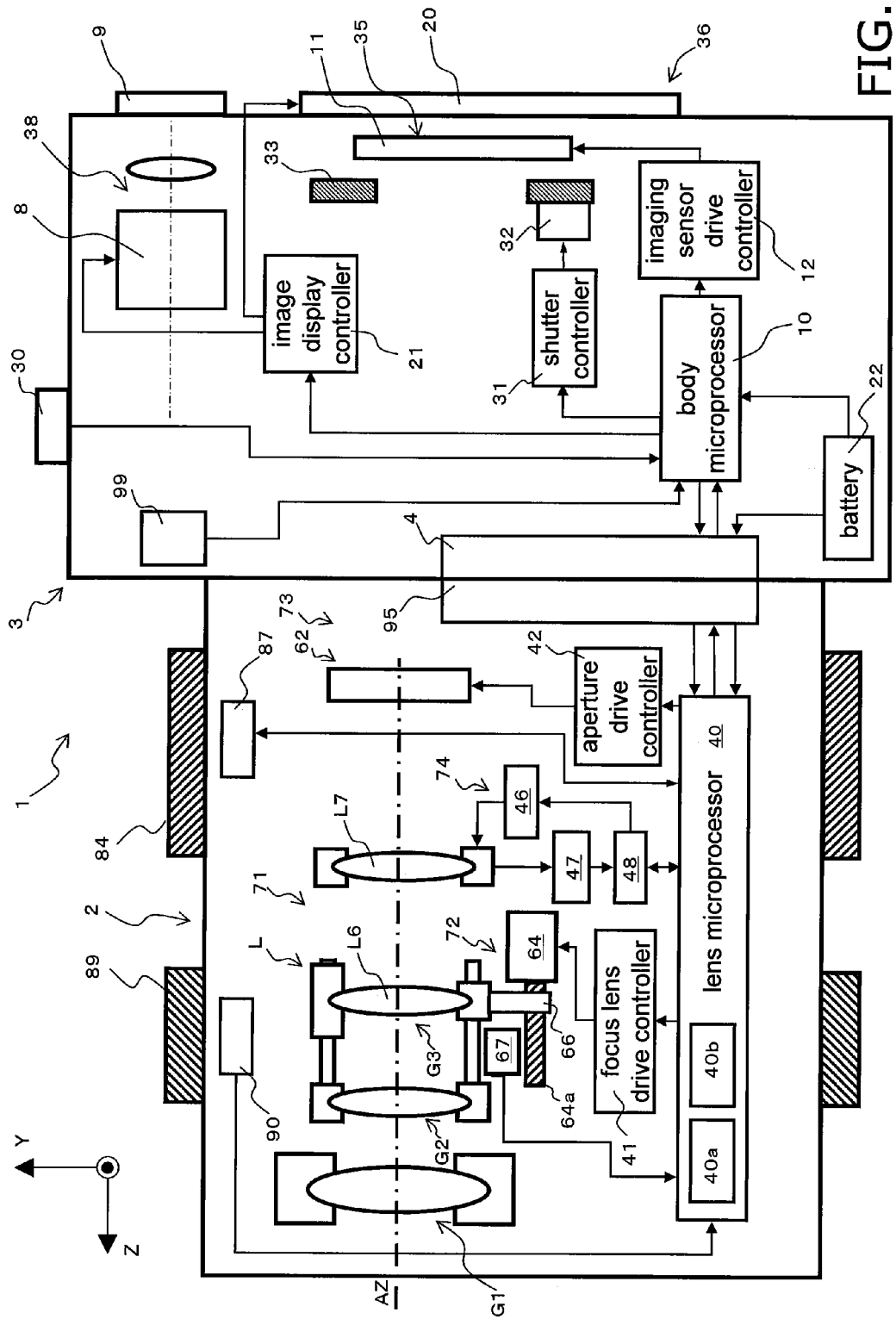
FIG. 1 is a simplified diagram of the configuration of a digital camera.

A digital camera 1 will be described through reference to FIGS. 1 to 13. FIG. 1 is a simplified diagram of the digital camera 1. As shown in FIG. 1, the digital camera 1 (an example of the imaging device) is a digital camera with an interchangeable lens, and mainly comprises a camera body 3 and an interchangeable lens unit 2 that is removably mounted to the camera body 3. The interchangeable lens unit 2 is mounted via a lens mount 95 to a body mount 4 provided to the front face of the camera body 3.

Figure 2:
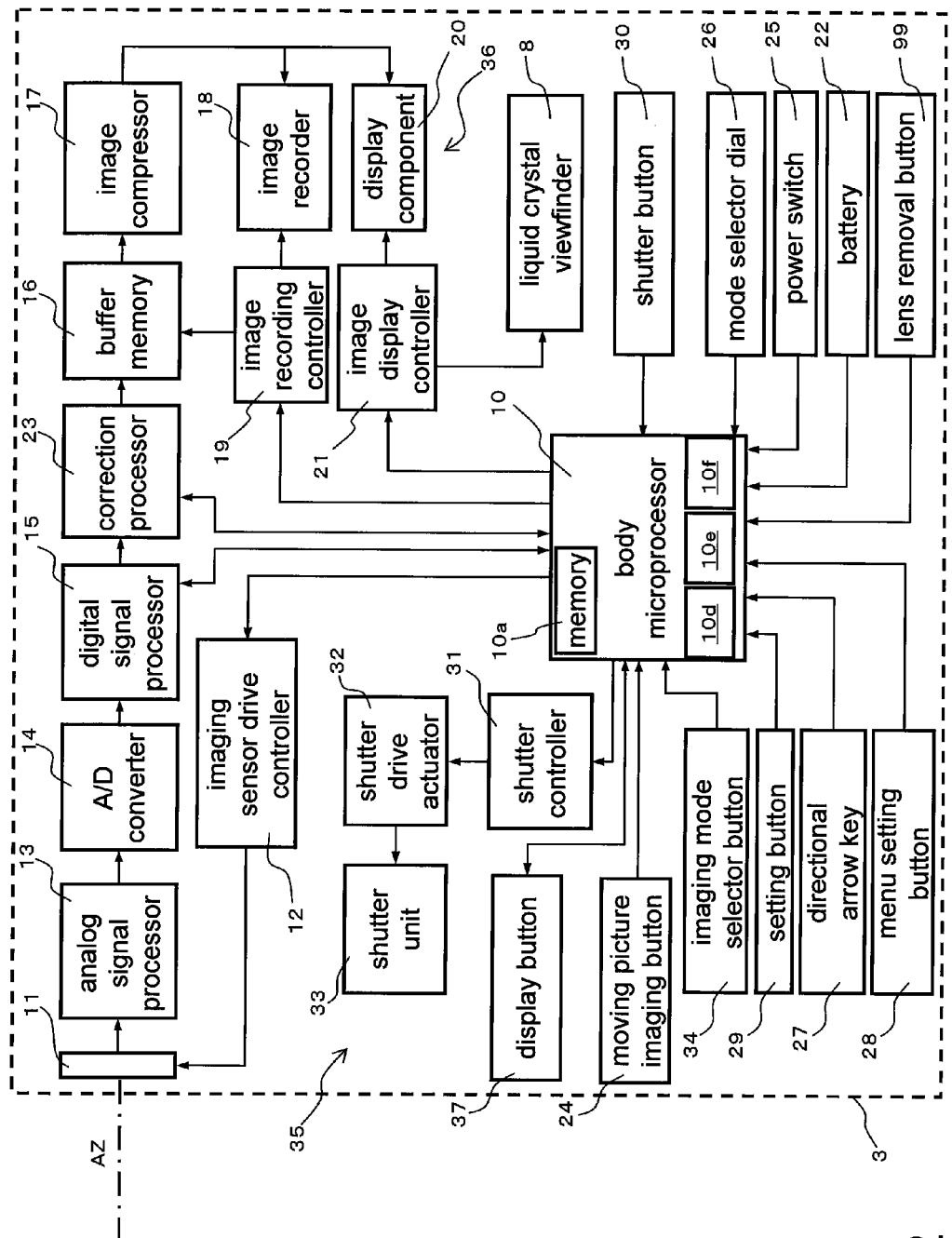
FIG. 2 is a block diagram of the configuration of a camera body.
Figure 3:
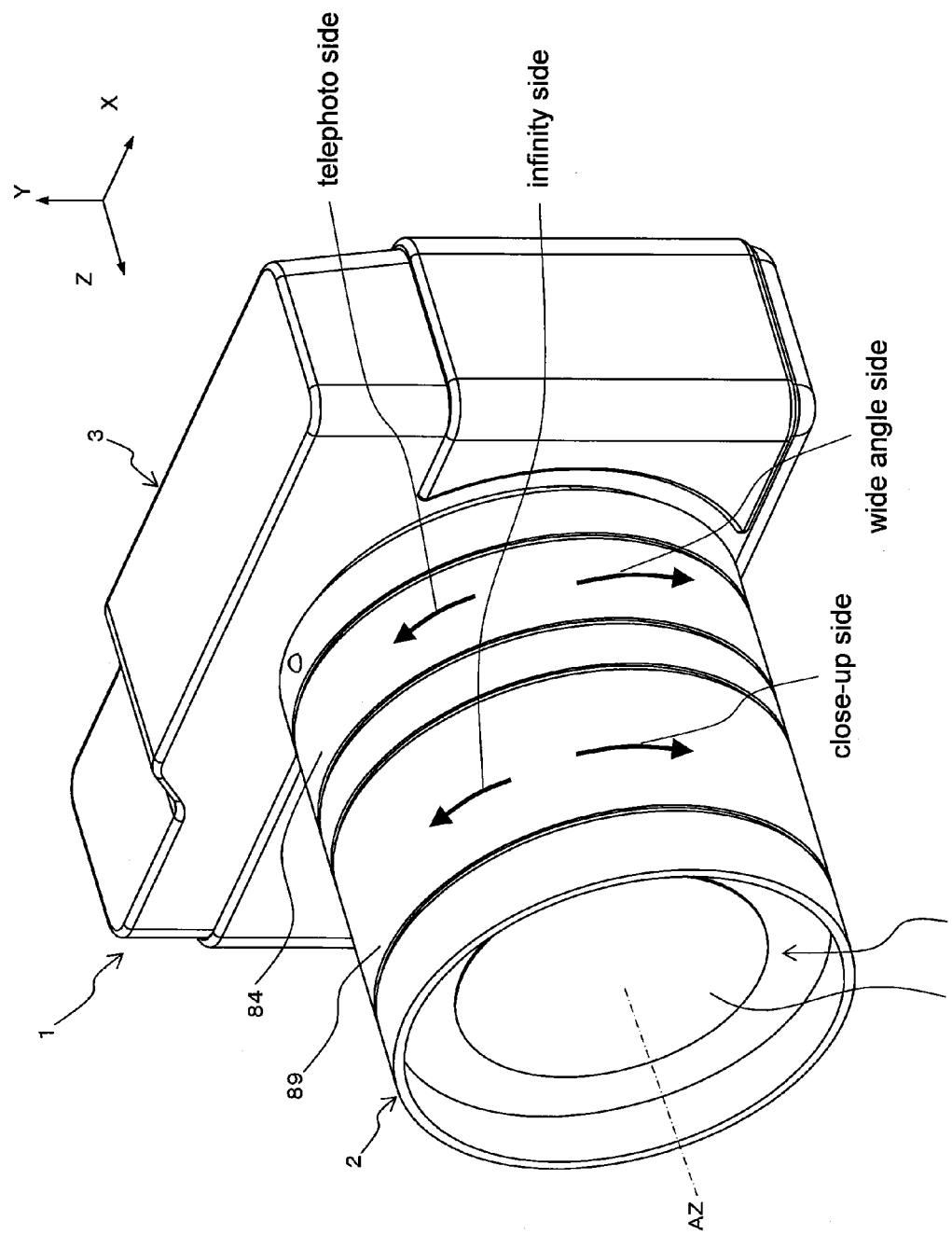
FIG. 3 is a simplified oblique view of a digital camera.
Figure 4A:
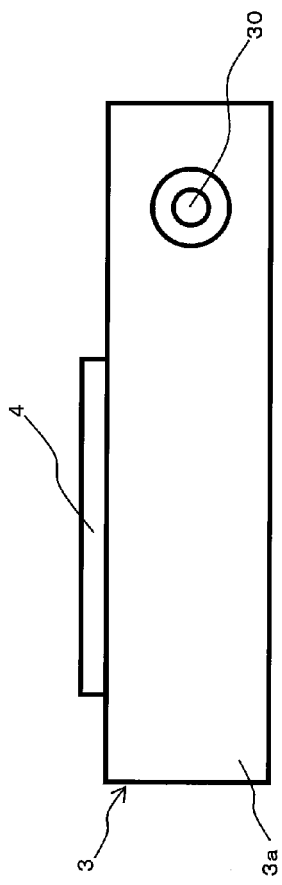
FIG. 4A is a top view of a camera body.
Figure 4B:
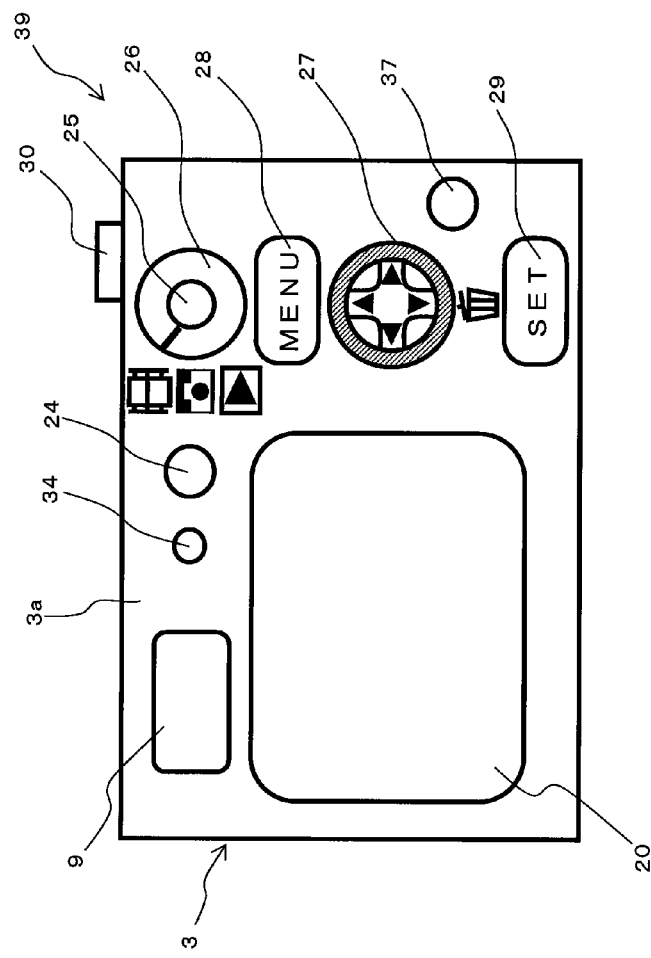
FIG. 4B is a rear view of a camera body.
Figure 5:
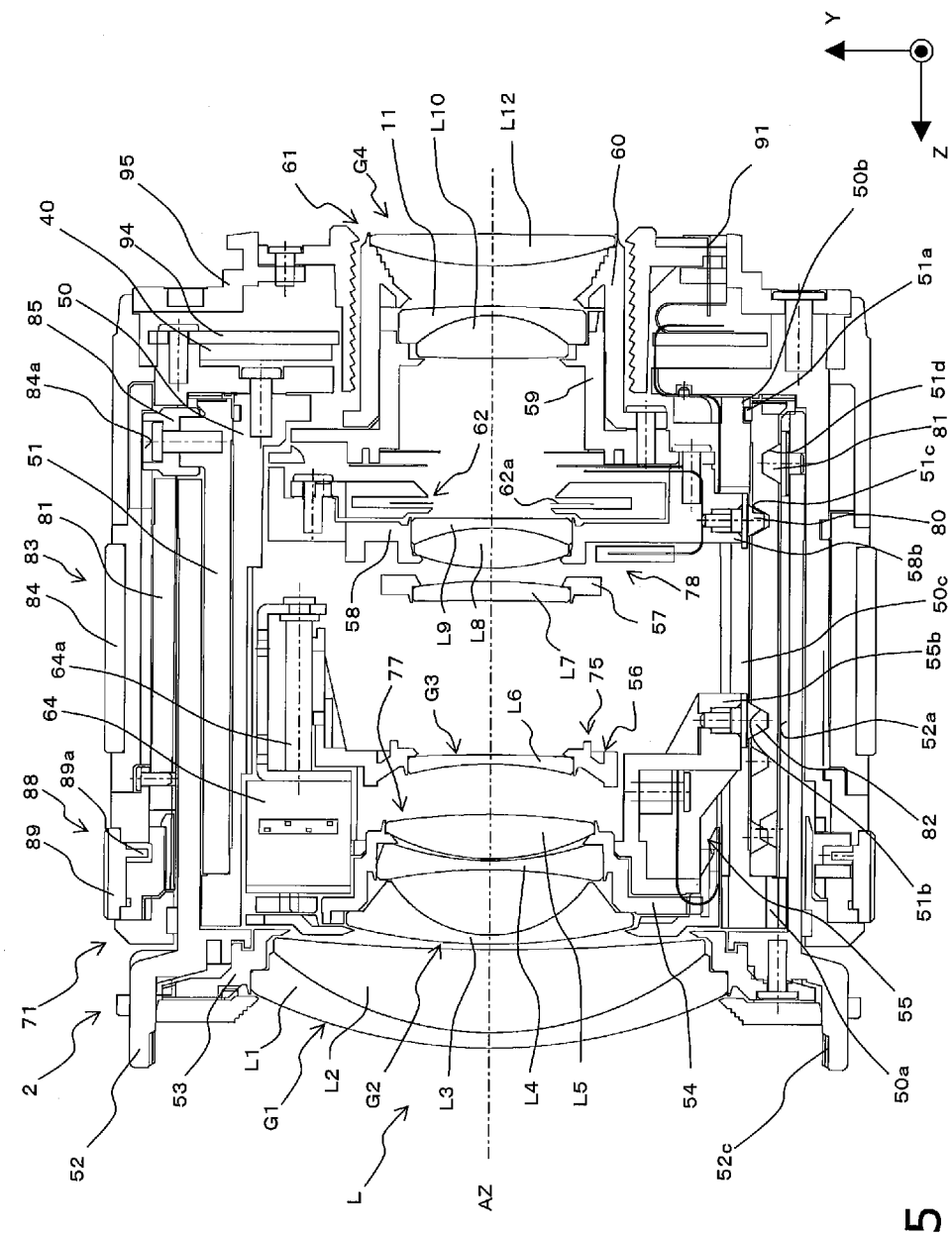
FIG. 5 is a cross section of an interchangeable lens unit (wide angle end)
Figure 6:
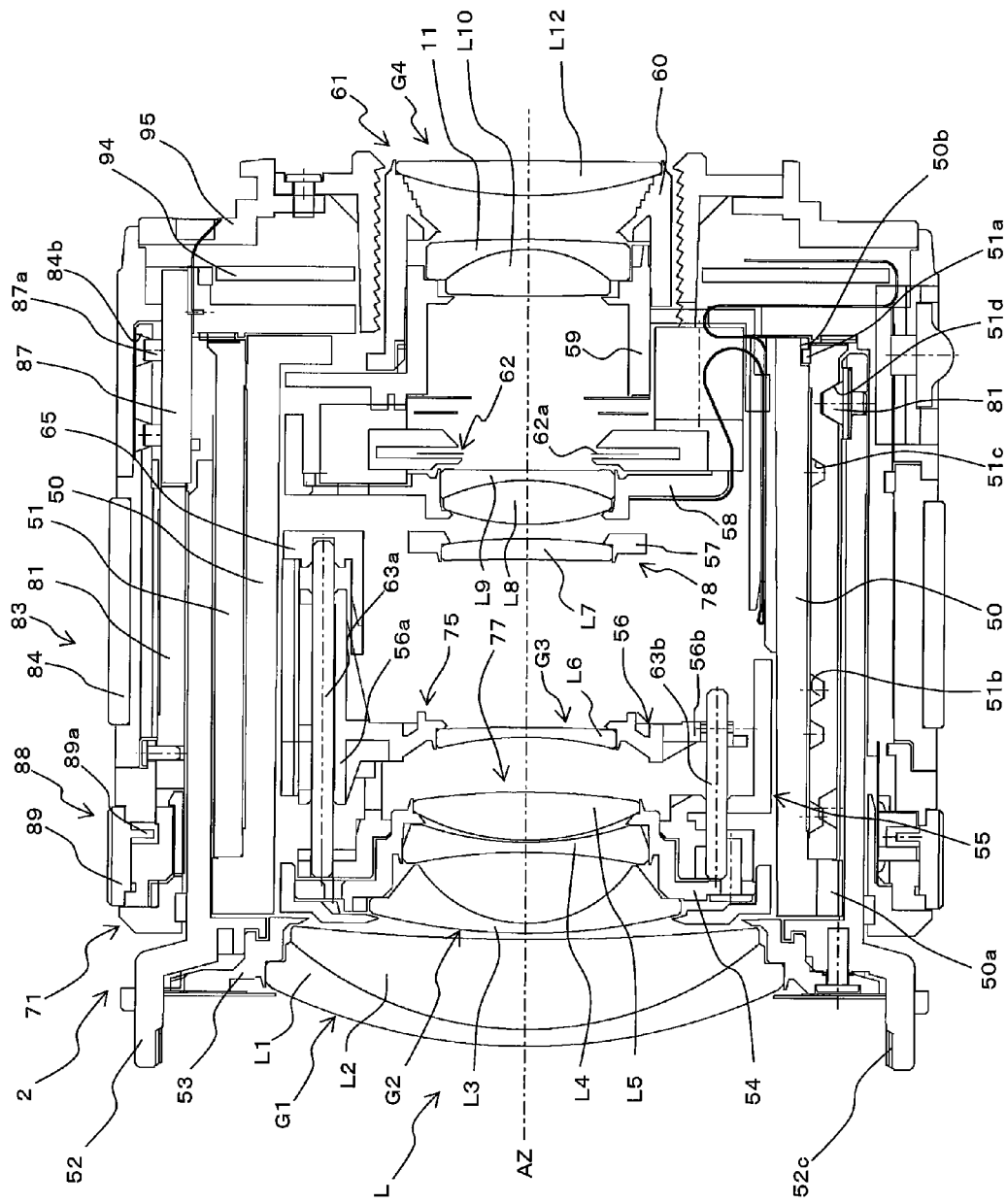
FIG. 6 is a cross section of an interchangeable lens unit (wide angle end)
Figure 7:
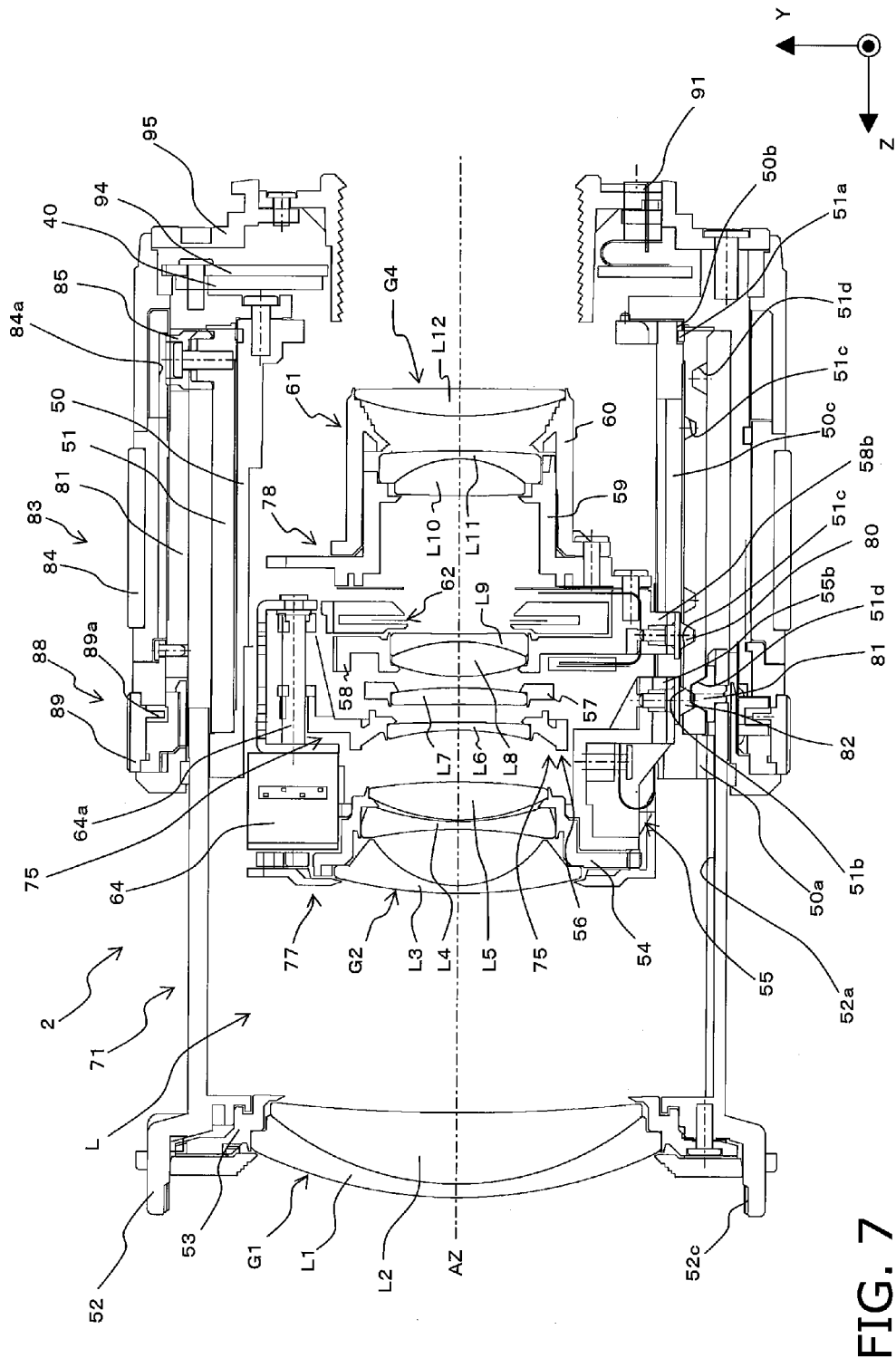
FIG. 7 is a cross section of an interchangeable lens unit (telephoto end)
Figure 8:
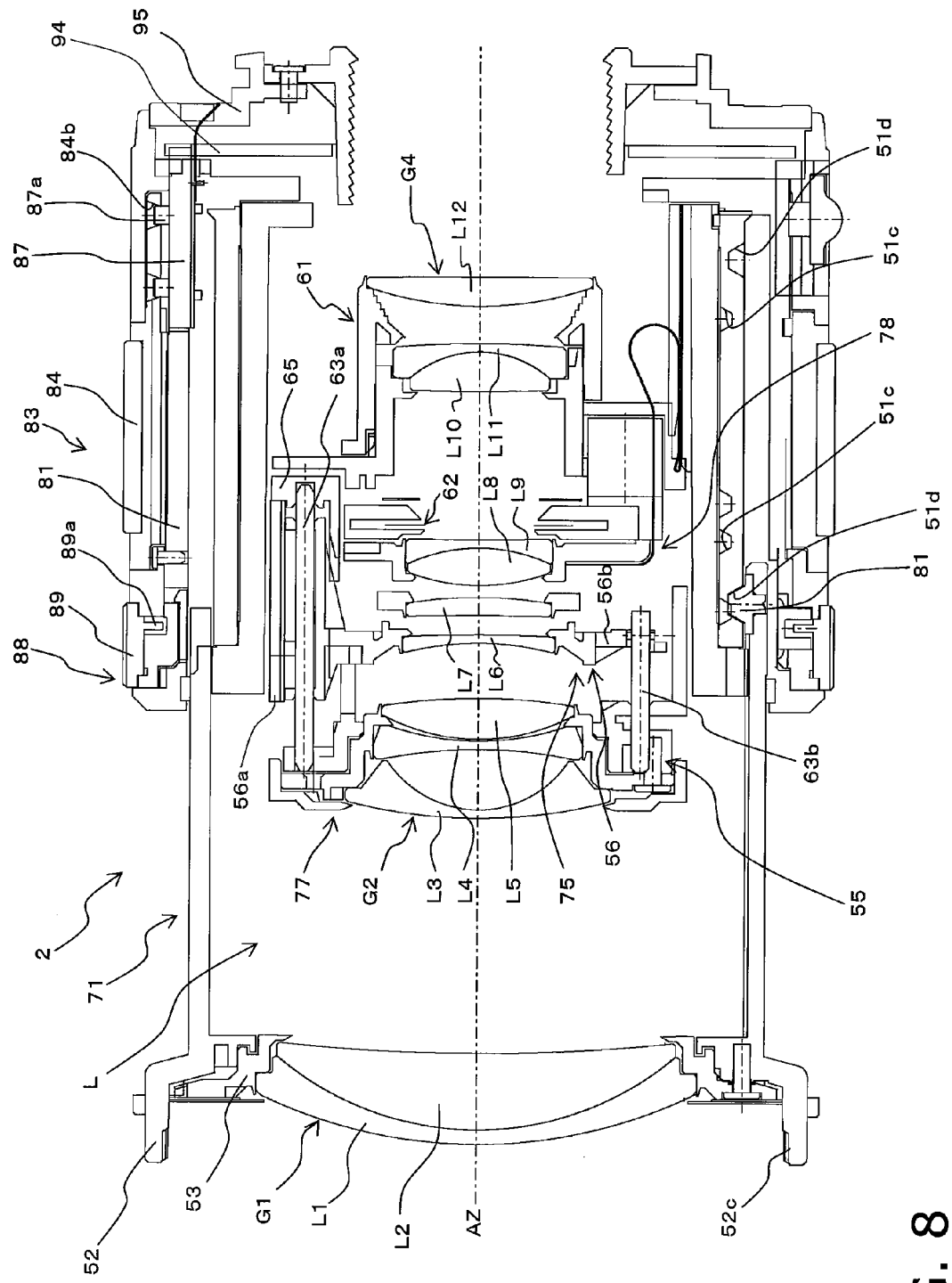
FIG. 8 is a cross section of an interchangeable lens unit (telephoto end)
Figure 9:
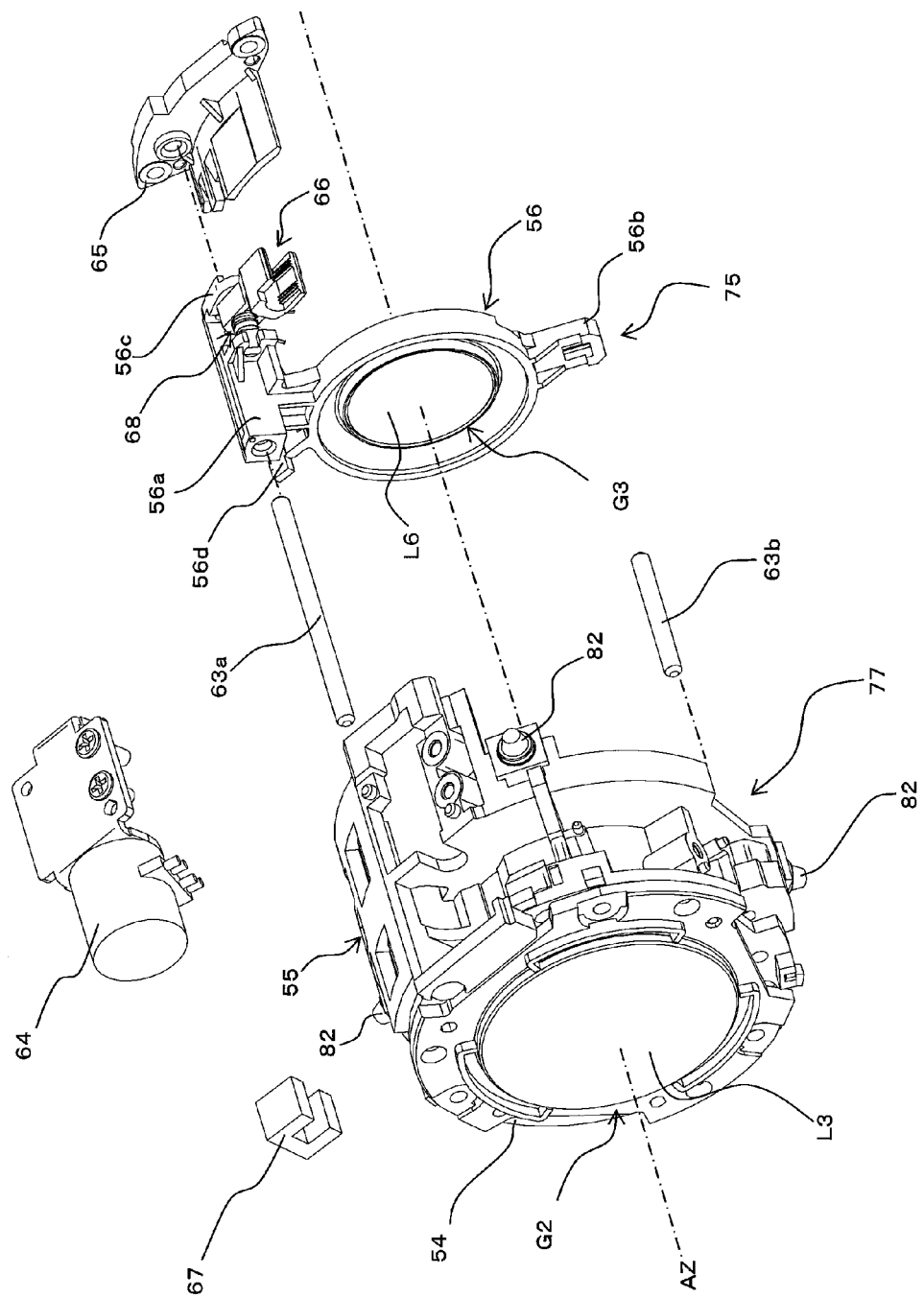
FIG. 9 is an exploded oblique view of a second lens group unit and a focus lens unit.
Figure 10:
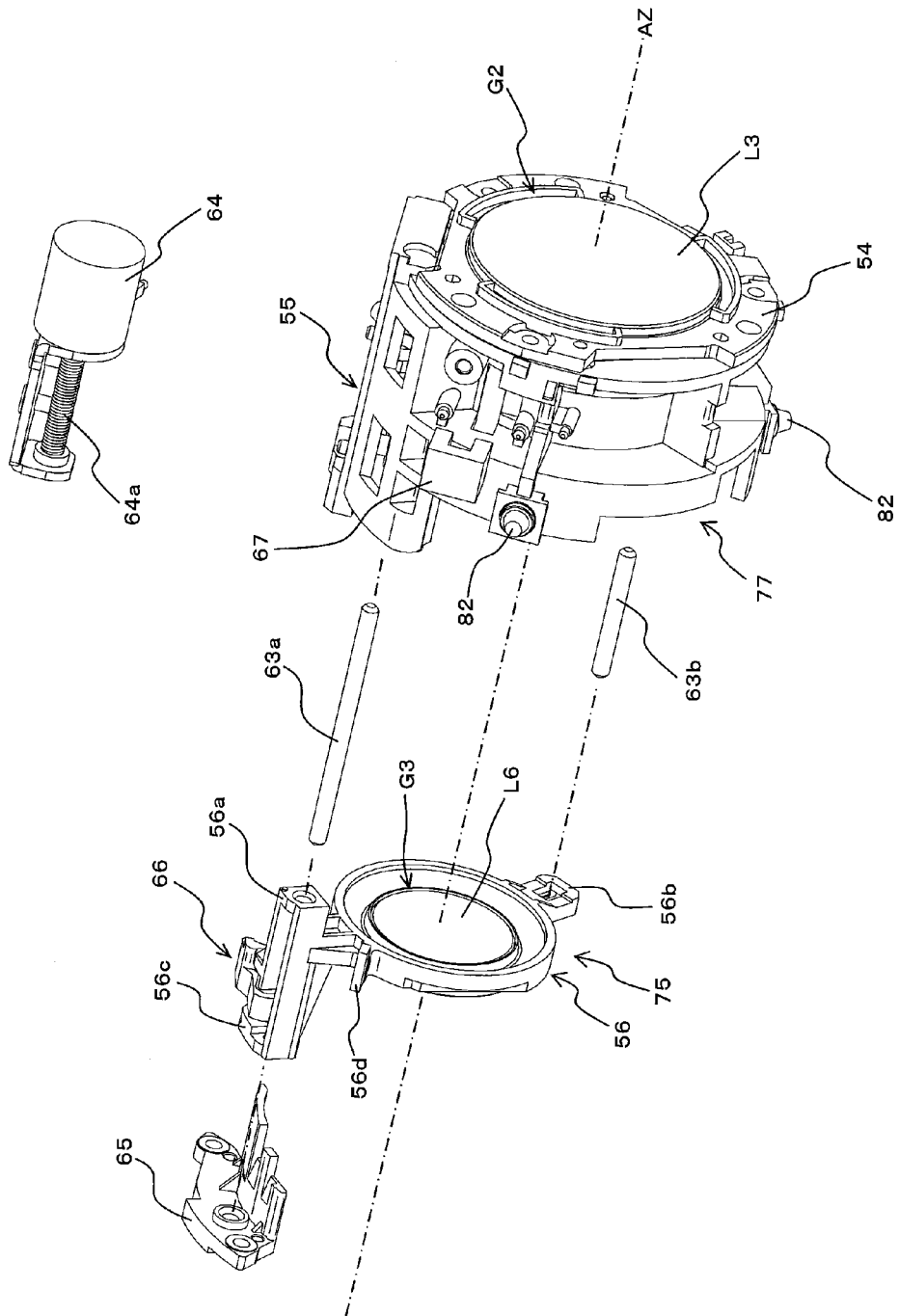
FIG. 10 is an exploded oblique view of a second lens group unit and a focus lens unit.
Figure 13:
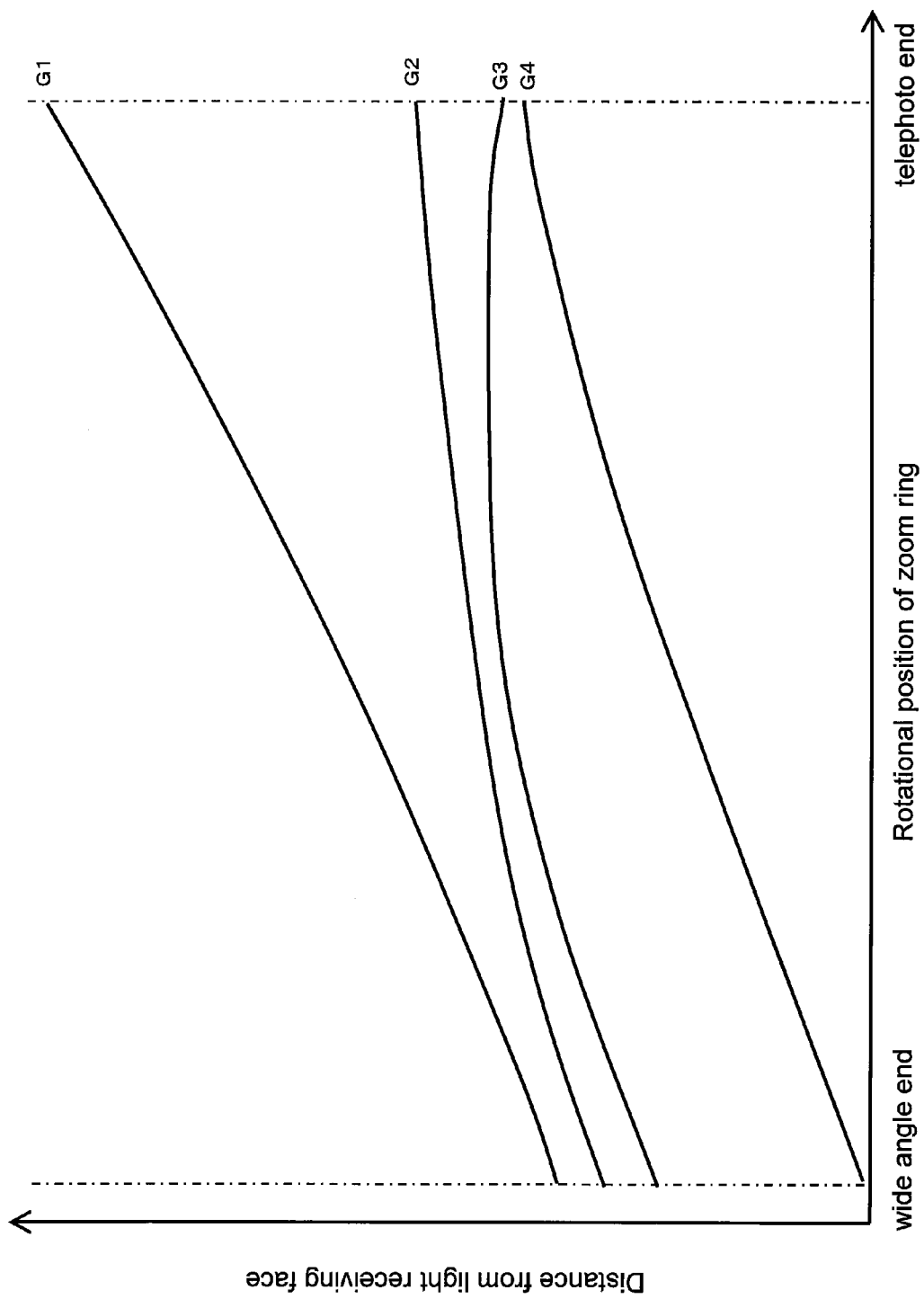
FIG. 13 is a graph of the relation between the rotational angle of a zoom ring and the distance of various members from an imaging sensor.

FIG. 2 is a block diagram of the configuration of the camera body 3. FIG. 3 is a simplified oblique view of the digital camera 1. FIG. 4A is a top view of the camera body 3, and FIG. 4B is a rear view of the camera body 3. FIGS. 5 to 8 are simplified cross sections of the interchangeable lens unit 2. FIGS. 5 and 6 show the state at the wide angle end, and FIGS. 7 and 8 show the state at the telephoto end. FIG. 6 is a cross section in a different plane from that of FIG. 5. FIG. 8 is a cross section in a different plane from that of FIG. 7. FIGS. 9 and 10 are exploded oblique views of a second lens group unit 77 and a focus lens unit 75. FIGS. 12A and 12B are diagrams of the configuration of an optical system L. FIG. 12A shows the state at the wide angle end, and FIG. 12B shows the state at the telephoto end. FIG. 13 is a graph of the relationship between the rotational position of a zoom ring 84 and the distance of the various members from an imaging sensor 11.

In this embodiment, a three-dimensionally perpendicular coordinate system is set with respect to the digital camera 1. The optical axis AZ of the optical system L (discussed below) coincides with the Z axis direction (an example of the optical axis direction). The X axis direction coincides with the horizontal direction when the digital camera 1 is in its portrait orientation, and the Y axis direction coincides with the vertical direction when the digital camera 1 is in its landscape orientation. In the following description, "front" means on the subject side of the digital camera 1 (the Z axis positive direction side), and "rear" means the opposite side from the subject side of the digital camera 1 (the user side, or the Z axis direction negative side).

Interchangeable Lens Unit

The basic configuration of the interchangeable lens unit 2 will be described through reference to FIGS. 1 to 12B. As shown in FIG. 1, the interchangeable lens unit 2 has the optical system L, a lens support mechanism 71 that supports the optical system L, a focus adjusting unit 72, an aperture adjusting unit 73, a blur correction unit 74, and a lens microcomputer 40.

(1) Optical System

The optical system L is a zoom lens system for forming an optical image of a subject, and is mainly made up of four lens groups. More specifically, as shown in FIGS. 12A and 12B, the optical system L has a first lens group G1 having a positive refractive power, a second lens group G2 having a negative refractive power, a third lens group G3 having a negative refractive power, and a fourth lens group G4 having a positive refractive power.

The first lens group G1 has a first lens L1 and a second lens L2 disposed on the imaging sensor 11 side of the first lens L1. The first lens L1 is a negative meniscus lens having a convex face that faces the subject side. The second lens L2 is a positive meniscus lens having a convex face that faces the subject side, and is joined to the first lens L1 via an adhesive layer.

The second lens group G2 has a third lens L3, a fourth lens L4 disposed on the imaging sensor 11 side of the third lens L3, and a fifth lens L5 disposed on the imaging sensor 11 side of the fourth lens L4. The third lens L3 is a negative meniscus lens having a convex face that faces the subject side. The fourth lens L4 is a biconcave lens. The fifth lens L5 is a biconvex lens.

The third lens group G3 is made up of a sixth lens L6. The sixth lens L6 is a negative meniscus lens having a convex face that faces the imaging sensor 11 side, and is disposed in the Z axis direction between the fifth lens L5 and a seventh lens L7 (in the Z axis direction between the second lens group G2 and the fourth lens group G4).

The fourth lens group G4 has the seventh lens L7, an eighth lens L8, a ninth lens L9, a tenth lens L10, an eleventh lens L11, and a twelfth lens L12. The seventh lens L7 is a positive meniscus lens for blur correction, and has a convex face that faces the imaging sensor 11 side. The eighth lens L8 is a biconvex lens. The ninth lens L9 is a biconcave lens, and is joined to the eighth lens L8 via an adhesive layer. The tenth lens L10 is a biconvex lens. The face of the tenth lens L10 on the subject side is aspherical. The eleventh lens L11 is a negative meniscus lens having a convex face that faces the subject side, and is joined to the tenth lens L10 via an adhesive layer. The twelfth lens L12 is a biconvex lens.

As shown in FIGS. 12A, 12B, and 13, when zooming in from the wide angle end to the telephoto end, the first lens group G1 to fourth lens group G4 each move in the Z axis direction along the optical axis AZ toward the subject side.

More precisely, when zooming in from the wide angle end to the telephoto end, the space between the first lens group G1 and the second lens group G2 increases, the space between the second lens group G2 and the third lens group G3 increases, and the space between the third lens group G3 and the fourth lens group G4 decreases. An aperture unit 62 (discussed below) moves to the subject side along with the fourth lens group G4.

When focusing from an infinity focal state to a close focal state, the third lens group G3 moves along the optical axis AZ to the subject side.

Furthermore, the seventh lens L7 moves in two directions perpendicular to the optical axis AZ in order to suppress blurring in the optical image attributable to movement of the digital camera 1.

(2) Lens Support Mechanism

The lens support mechanism 71 is for movably supporting the optical system L, and has the lens mount 95, a fixed frame 50, a cam barrel 51, a first holder 52, a first lens group support frame 53, a second lens group support frame 54, a second holder 55, a third lens group support frame 56, a fourth lens group support frame 61, a zoom ring unit 83, and a focus ring unit 88.

The lens mount 95 is the portion of the camera body 3 that is mounted to the body mount 4, and has a lens-side contact 91. The fixed frame 50 is a member that rotatably supports the cam barrel 51, and is fixed to the lens mount 95. The fixed frame 50 has a protrusion 50a at the end on the Z axis direction positive side, three concave portions 50b provided to the outer periphery, and three linear through-grooves 50c disposed at an equal pitch around the optical axis AZ. The cam barrel 51 has three convex portions 51a provided to the inner periphery, three first cam grooves 51d, three second cam grooves 51b, and three third cam grooves 51c. Since the convex portions 51a of the cam barrel 51 are inserted into the concave portions 50b of the fixed frame 50, in a state in which relative movement is restricted in the Z axis direction, the cam barrel 51 is supported by the fixed frame 50 to be rotatable with respect to the fixed frame 50.

The first lens group support frame 53 is fixed to the first holder 52 and supports the first lens group G1. The first holder 52 has a longitudinal groove 52a that is formed on the inner peripheral side and extends in the Z axis direction, and three cam pins 81 that are disposed at a constant pitch around the optical axis AZ. The protrusion 50a of the fixed frame 50 is inserted in the longitudinal groove 52a. The cam pins 81 are inserted in the first cam grooves 51d of the cam barrel 51. This configuration allows the first holder 52 to move in the Z axis direction without rotating with respect to the fixed frame 50. The amount of movement of the first holder 52 with respect to the fixed frame 50 is determined by the shape of the first cam grooves 51d. Female threads 52c for attaching a conversion lens and an optical filter, such as a polarizing filter or a protective filter, are formed at the distal end of the first holder 52.

The second lens group support frame 54 is fixed to the second holder 55 and supports the second lens group G2. The second lens group support frame 54 and second holder 55 constitute the second lens group unit 77. The second holder 55 has three convex portions 55b that are disposed at a constant pitch around the optical axis AZ, and three cam pins 82 that are fixed to the convex portions 55b. The cam pins 82 are inserted into the second cam grooves 51b. The convex portions 55b are inserted into the linear through-grooves 50c of the fixed frame 50. This configuration allows the second lens group support frame 54 and the second holder 55 to move in the Z axis direction without rotating with respect to the fixed frame 50. The amount of movement of the second lens group support frame 54 and the second holder 55 with respect to the fixed frame 50 is determined by the shape of the second cam grooves 51b.

The third lens group support frame 56 is a member that supports the third lens group G3 (more precisely, the sixth lens L6 that functions as a focus lens), and has a bearing part 56a, an anti-rotation part 56b, a rack support 56c, and a protrusion 56d. The sixth lens L6 and the third lens group support frame 56 constitute the focus lens unit 75. The second holder 55 supports the front ends of two guide poles 63a and 63b that extend in the Z axis direction. A guide pole support plate 65 is a member for supporting the rear end of the guide pole 63a, and is fixed on the imaging sensor 11 side of the second holder 55. The guide pole 63a is inserted into the bearing part 56a, and the guide pole 63b is inserted into the anti-rotation part 56b. The third lens group support frame 56 is supported movably in the Z axis direction by the guide poles 63a and 63b while being restricted in rotation around the optical axis AZ.

The rack support 56c is a member that extends from the bearing part 56a to the Z axis direction negative side, and supports a rack 66 rotatably and movably integrally in the axial direction. The rack 66 has a rack main body 66a having a plurality of teeth 66c, and a shaft 66b that extends in the Z axis direction. The plurality of teeth 66c mesh with a lead screw 64a of a focus motor 64. The shaft 66b is supported by the rack support 56c, so the rack 66 is able to rotate around the center axis R with respect to the rack support 56c.

Figure 11:
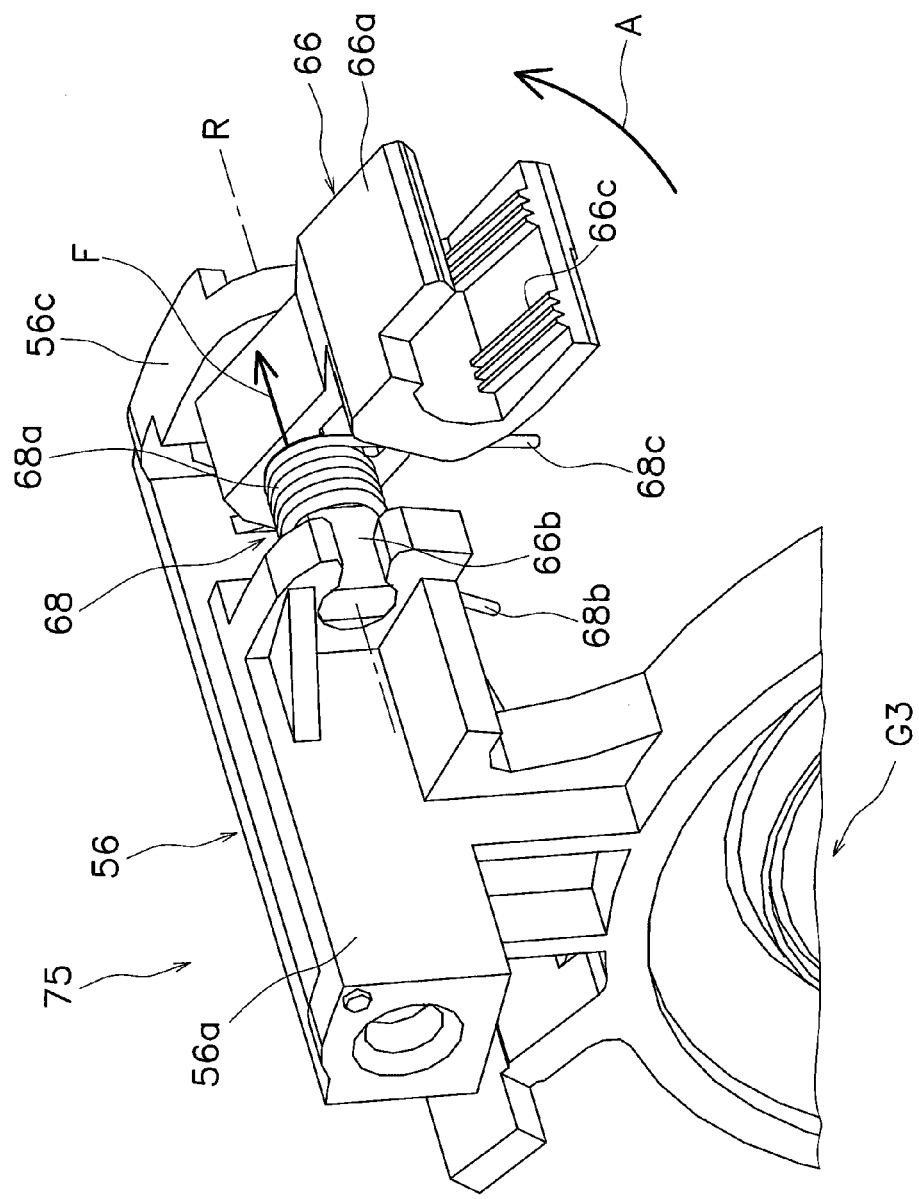
FIG. 11 is a partial oblique view of a focus lens unit.

As shown in FIGS. 9 and 11, a torsion coil spring 68 is attached to the rack support 56c. The torsion coil spring 68 has a wound portion 68a that generates elastic force, a first end 68b, and a second end 68c. The wound portion 68a is fitted to the shaft 66b of the rack 66. With the wound portion 68a twisted, the first end 68b is hooked onto the rack support 56c, while the second end 68c is hooked onto the rack 66. That is, the torsion coil spring 68 imparts rotational force in an A direction to the rack 66, and constantly presses the rack 66 against the lead screw 64a. This reduces backlash between the rack 66 and the lead screw 64a, and increases the positional accuracy of the focus lens unit 75. Also, since the rack 66 is constantly pressed against the lead screw 64a, drive force can be more efficiently transmitted from the lead screw 64a to the rack 66.

The wound portion 68a of the torsion coil spring 68 is also compressed in the Z axis direction (the direction parallel to the center axis R) between the rack support 56c and the rack 66. The torsion coil spring 68 imparts a pressing force F to the rack 66, and the torsion coil spring 68 presses the rack 66 against the rack support 56c. This reduces movement of the rack 66 in the Z axis direction with respect to the rack support 56c, and further improves the positional accuracy of the focus lens unit 75.

The focus motor 64 is fixed to the second holder 55. The focus motor 64 is a stepping motor, for example. The focus motor 64 has the lead screw 64a as its rotational shaft extending in the Z axis direction. This lead screw 64a meshes with the rack 66.

The protrusion 56d is a portion for detecting the starting point of the focus lens unit 75, and is provided at a location that can pass through the detection region of a photosensor 67 (discussed below). In this embodiment, since the third lens group G3 (a focus lens group) is formed by the single sixth lens L6, the weight of the third lens group G3 can be 1 g or less, for example, which allows the drive speed with the focus motor 64 to be higher.

The fourth lens group support frame 61 has a first support frame 57, a second support frame 58, a third support frame 59, and a fourth support frame 60. The fourth lens group G4 and the fourth lens group support frame 61 constitute a fourth lens group unit 78.

The first support frame 57 supports the seventh lens L7. The second support frame 58 supports the eighth lens L8 and the ninth lens L9, and also supports the first support frame 57 movably in two directions perpendicular to the optical axis AZ. The second support frame 58 has three cam pins 80 that are disposed at a constant pitch around the optical axis AZ.

The third support frame 59 supports the tenth lens L10 and the eleventh lens L11, and is fixed by screws, for example, to the second support frame 58. The fourth support frame 60 supports the twelfth lens L12, and is fixed by screws, for example, to the third support frame 59. Because of their configuration, the first support frame 57, the second support frame 58, the third support frame 59, and the fourth support frame 60 move integrally along the optical axis AZ.

The first support frame 57 is supported by the second support frame 58 so as to be movable in two directions perpendicular to the optical axis AZ, for example. This configuration allows the first support frame 57 to move integrally in the Z axis direction with respect to the second support frame 58, the third support frame 59, and the fourth support frame 60, while allowing movement in a direction perpendicular to the optical axis AZ.

The zoom ring unit 83 has a ring base 86, the zoom ring 84, and a linear position sensor 87 that detects the rotational position of the zoom ring 84. The "rotational position of the zoom ring 84" refers to the position of the zoom ring 84 in the rotational direction, and can also be considered to be the rotational angle of the zoom ring 84 from a reference position.

The zoom ring 84 has a cylindrical shape, and is supported by the ring base 86 fixed to the fixed frame 50, so as to be movable around the optical axis AZ in a state in which movement in the Z axis direction is restricted. The zoom ring 84 has a through-hole 84a at the end on the Z axis direction negative side. A zoom drive pin 85 that is fixed to the cam barrel 51 is inserted into the through-hole 84a. Consequently, the cam barrel 51 rotates integrally with the zoom ring 84 around the optical axis AZ.

The linear position sensor 87 detects the rotational position and rotational direction in which the user has put the zoom ring 84, and sends the detection result to the lens microcomputer 40. More specifically, the linear position sensor 87 is fixed to the ring base 86 and has a slider 87a that protrudes outward in the radial direction. This slider 87a is inserted into a cam groove 84b formed in the zoom ring 84. When the zoom ring 84 is rotated with respect to the fixed frame 50, the slider 87a moves in the Z axis direction along the cam groove 84b. The linear position sensor 87 has a varistor, and when the slider 87a sliders over a magnetic resistor that is inside this varistor, output (output voltage) that is proportional to the position of the slider 87a in the Z axis direction can be obtained linearly between terminals at both ends to which a specific voltage has been applied. The output of the linear position sensor 87 is converted into rotational position information, which allows the rotational position of the zoom ring 84 to be detected. The focal length of the optical system L is displayed on the outer peripheral face of the zoom ring 84.

Since the first lens group G1 to fourth lens group G4 are mechanically linked via the lens support mechanism 71, the absolute positions of the first lens group G1 to fourth lens group G4 (such as their positions using a light receiving face 11a of the imaging sensor 11 as a reference) have a specific relationship to the rotational position of the zoom ring 84.

Therefore, if the rotational position of the zoom ring 84 is detected, the absolute positions of the first lens group G1 to fourth lens group G4 with respect to the lens mount 95 can be ascertained. The zoom ring 84 may have another structure instead, such as a movable lever.

The focus ring unit 88 has a focus ring 89 and a focus ring angle detector 90 that detects the rotational angle of the focus ring 89. The focus ring 89 has a cylindrical shape, and is supported by the ring base 86 rotatably around the optical axis AZ in a state in which movement in the Z axis direction is restricted. The rotational angle and rotational position of the focus ring 89 can be detected by the focus ring angle detector 90. The focus ring angle detector 90 has two photosensors (not shown), for example. The focus ring 89 has a plurality of protrusions 89a that protrude inward in the radial direction and are disposed at equidistant spacing in the rotational direction. Each of these photosensors has a light emitting part (not shown) and a light receiving part (not shown), and the plurality of protrusions 89a pass in between the light emitting parts and the light receiving parts, allowing the rotational angle and rotational direction of the focus ring 89 to be detected. The focus ring 89 may have another structure instead, such as a movable lever.

(3) Focus Adjusting Unit

The focus adjusting unit 72 has the focus motor 64, a focus drive controller 41, and the photosensor 67. The focus motor 64 is fixed to the second holder 55 and drives the focus lens unit 75 in the Z axis direction with respect to the second lens group unit 77. The drive of the focus lens unit 75 with respect to the second lens group unit 77 is performed by the focus motor 64 alone. In other words, in a state in which the focus motor 64 is not driving the focus lens unit 75 (such as when no power is being supplied to the focus motor 64), the focus lens unit 75 cannot be moved with respect to the second lens group unit 77. In this case, the focus lens unit 75 moves in the Z axis direction integrally with the second holder 55.

The lead screw 64a of the focus motor 64 rotates on the basis of a drive signal inputted from the focus drive controller 41. The rotary motion generated by the focus motor 64 is converted by the lead screw 64a and the rack 66 into linear motion of the focus lens unit 75 in the Z axis direction. Consequently, the focus lens unit 75 can move in the Z axis direction with respect to the second lens group unit 77.

With this digital camera 1, to achieve a zoom lens system with which the focal length can be varied while keeping the subject distance substantially constant, the focus lens unit 75 is driven by the focus adjusting unit 72 on the basis of a tracking table stored ahead of time in the lens microcomputer 40. This type of tracking is called electronic tracking here.

The tracking table contains information indicating the position of the focus lens unit 75 where the focused subject distance remains substantially constant even if the focal length changes (more precisely, the position of the focus lens unit 75 with respect to the second lens group unit 77). The phrase "the subject distance remains substantially constant" means that the amount of change in the subject distance falls within a specific subject field depth. Electronic tracking will be discussed below.

The photosensor 67, which detects the starting point position of the focus lens unit 75, is installed in the second holder 55. This photosensor 67 has a light emitting part (not shown) and a light receiving part (not shown). When the protrusion 56d of the third lens group support frame 56 passes between the light emitting part and the light receiving part, the photosensor 67 can detect the presence of the protrusion 56d. That is, the starting point position of the focus lens unit 75 with respect to the second lens group unit 77 can be detected by the photosensor 67. In other words, the photosensor 67 is a starting point detector that detects the starting point position of the third lens group G3 with respect to the second lens group G2. The lens microcomputer 40 drives the third lens group G3 to the starting point position, and checks whether the focus lens unit 75 (the third lens group G3) is in the starting point position by using a signal from the photosensor 67.

The starting point position that can be detected by the photosensor 67 is an absolute position that never moves with respect to the second lens group unit 77. Accordingly, when the position of the focus lens unit 75 is reset to the starting point position with respect to the second lens group unit 77, the photosensor 67 drives the focus lens unit 75 to the position where the protrusion 56d for starting point detection is detected. When the power switch 25 is turned off, the focus lens unit 75 is driven by the focus motor 64 to a position where the protrusion 56d of the third lens group 56 is detected by the photosensor 67 regardless of the position of focus lens unit 75, for example. Upon completion of the drive of the focus lens unit 75, the power supply to the digital camera 1 is halted. Conversely, when a power switch 25 of the digital camera 1 is turned on, the focus motor 64 drives the focus lens unit 75 to a specific position determined on the basis of the tracking table. The starting point detector is not limited to being a photosensor, and may instead be a combination of a magnet and a magnetic sensor, for example.

(4) Aperture Adjusting Unit

The aperture adjusting unit 73 has the aperture unit 62 fixed to the second support frame 58, an aperture drive motor (not shown) that drives the aperture unit 62, and an aperture drive controller 42 that controls the aperture drive motor. The aperture drive motor is a stepping motor, for example. The aperture drive motor is driven on the basis of a drive signal inputted from the aperture drive controller 42. The drive force generated by the aperture drive motor drives aperture blades 62a in the opening and closing directions. The aperture value of the optical system L can be changed by driving the aperture blades 62a.

(5) Blur Correction Unit

The blur correction unit 74 is for reducing blurring of the optical image attributable to movement of the interchangeable lens unit 2 and the camera body 3, and has an electromagnetic actuator 46, a position detecting sensor 47, and a blur correction microprocessor 48.

The electromagnetic actuator 46 drives the first support frame 57 in a direction perpendicular to the optical axis AZ. More specifically, the electromagnetic actuator 46 has a magnet (not shown) and a coil (not shown), for example. For instance, the coil is provided to the first support frame 57, and the magnet is fixed to the second support frame 58.

The position detecting sensor 47 is for detecting the position of the first support frame 57 with respect to the second support frame 58, and is a hole element, for example. A movement detecting sensor (not shown) such as a gyro sensor is installed in the interchangeable lens unit 2. The blur correction microprocessor 48 controls the electromagnetic actuator 46 on the basis of the detection result of the position detecting sensor 47 and the detection result of the movement detecting sensor. Consequently, blurring of the optical image attributable to movement of the digital camera 1 can be reduced.

Reducing blurring of the subject image may instead be accomplished by electronic blur correction, in which blurring that appears in an image is corrected on the basis of image data outputted from the imaging sensor 11. Also, blurring of the subject image may be reduced by a sensor shift method in which the imaging sensor 11 is driven in two directions perpendicular to the optical axis AZ.

(6) Lens Microcomputer

A lens microcomputer 40 has a CPU (not shown), a ROM (not shown), and a memory 40a, and various functions can be performed by reading programs stored in the ROM into the CPU. For instance, the lens microcomputer 40 can recognize that a focus lens unit 75 is in its home position by using a detection signal from a photosensor 67.

The memory 40a is a nonvolatile memory, and can hold stored information even when the power supply has been halted. Information related to an interchangeable lens unit 2 (lens information), and a tracking table (discussed below) for realizing a zoom lens system, for example, are held in the memory 40a. Lens information includes, for example, information related to whether or not distortion correction is needed, and various data for distortion correction. The lens microcomputer 40 controls a focus motor 64 on the basis of a tracking table, and the focus lens unit 75 is driven in the Z axis direction by the focus motor 64. An operation in which the position of the focus lens unit 75 is made to conform to changes in the focal length on the basis of a tracking table will hereinafter be referred to as electronic tracking.

The lens microcomputer 40 has a counter 40b for counting the number of pulses of the focus motor 64. The counter 40b is set to a count of "+1" when the focus lens unit 75 is driven to the Z axis direction positive side, and to a count of "−1" when the focus lens unit 75 is driven to the Z axis direction negative side. The lens microcomputer 40 can thus ascertain the relative position of a third lens group G3 with respect to second lens group G2 by counting the number of drive pulses of the focus motor 64 with the counter 40b.

For instance, a rack 66 is driven by 0.3 mm in the Z axis direction for every rotation of a lead screw 64a of the focus motor 64. When the focus motor 64, which has a 10-pole magnet (not shown), is driven by 1-2 phase excitation, the rack 66 is driven by 0.3/20/2=0.0075 mm (7.5 µm) in the Z axis direction for every pulse. During micro-step drive, the rack 66 can be driven in even finer units. If a stepping motor is used, the focus lens unit 75 can be driven in fine units, and backlash can be reduced during reverse drive, for example. That is, high-precision focus adjustment can be achieved by choosing a stepping motor as the focus motor 64. Also, if the drive pulses are counted, the current position of the focus lens unit 75 with respect to a second lens group unit 77 can be ascertained, and the amount of drive of the focus lens unit 75 can be calculated.

Camera Body

The basic configuration of the camera body 3 will be described through reference to FIGS. 1 to 4B. As shown in FIGS. 1 to 4B, the camera body 3 has a case 3a, a body mount 4, an operating unit 39, an image acquisition unit 35, an image display unit 36, a viewfinder unit 38, a body microcomputer 10 (an example of a display controller, an example of a mounting determination component, an example of a correction decision section, and an example of an information acquisition section), and a battery 22.

(1) Case

The case 3a constitutes the outer part of the camera body 3. As shown in FIGS. 4A and 4B, the body mount 4 is provided to the front face of the case 3a, and the operating unit 39 is provided to the rear and top faces of the case 3a. More specifically, a liquid crystal monitor 20, the power switch 25, a mode selector dial 26, a navigation key 27, a menu setting button 28, a setting button 29, a imaging mode selector button 34, and a moving picture capture operation button 24 are provided to the rear face of the case 3a. A shutter button 30 is provided to the top face of the case 3a.

(2) Body Mount

The body mount 4 is the portion of the interchangeable lens unit 2 where the lens mount 95 is mounted, and has a body-side contact (not shown) that can be electrically connected with the lens-side contact 91. The camera body 3 is able to send and receive data to and from the interchangeable lens unit 2 via the body mount 4 and the lens mount 95. For example, the body microcomputer 10 (discussed below) sends the lens microcomputer 40 a control signal, such as an exposure synchronization signal, via the body mount 4 and the lens mount 95.

(3) Operating Unit

As shown in FIGS. 4A and 4B, an operating unit 39 has various operation members that are used by the user to input operating information. For example, a power switch 25 is used to turn on and off the power supply to a digital camera 1 or a camera body 3. When the power is turned on with the power switch 25, power is supplied to the various components of the camera body 3 and the interchangeable lens unit 2.

A mode selector dial 26 is used to switch the operating mode, such as still picture imaging mode, moving picture imaging mode, or reproduction mode, and the user can turn the mode selector dial 26 to switch the operating mode. When the still picture imaging mode is selected with the mode selector dial 26, the operating mode is switched to the still picture imaging mode, and when the moving picture imaging mode is selected with the mode selector dial 26, the operating mode is switched to the moving picture imaging mode. In the moving picture imaging mode, basically moving picture imaging is possible. When the reproduction mode is selected with the mode selector dial 26, the operating mode is switched to the reproduction mode, allowing the captured image to be displayed on a liquid crystal monitor 20.

A directional arrow key 27 is used to select the left, right, up, and down directions. The user can use the directional arrow key 27 to select the desired menu from various menu screens displayed on the liquid crystal monitor 20, for example.

A menu setting button 28 is used for setting the various operations of the digital camera 1. A set button 29 is used for executing the operations of the various menus.

A moving picture imaging button 24 is used for starting and stopping the capture of moving pictures. Even if the operating mode selected with the mode selector dial 26 is the still picture imaging mode or the reproduction mode, when the moving picture imaging button 24 is pressed, the operating mode is forcibly changed to the moving picture imaging mode, and moving picture imaging begins, regardless of the setting on the mode selector dial 26. When this moving picture imaging button 24 is pressed during the capture of a moving picture, the moving picture imaging ends and the operating mode changes to the one selected on the mode selector dial 26, that is, to the one prior to the start of moving picture imaging. For example, if the still picture imaging mode has been selected with the mode selector dial 26 when the moving picture imaging button 24 is pressed, the operating mode automatically changes to the still picture imaging mode after the moving picture imaging button 24 is pressed again.

A shutter button 30 is pressed by the user to capture an image. When the shutter button 30 is pressed, a timing signal is outputted to a body microcomputer 10. The shutter button 30 is a two-stage switch that can be pressed half-way down or all the way down. Light measurement and ranging are commenced when the user presses the button half-way down. When the user presses the shutter button 30 all the way down in a state in which the shutter button 30 has been pressed half-way down, a timing signal is outputted, and image data is acquired by an image acquisition unit 35.

As shown in FIG. 2, a lens removal button 99 (an example of a lens removal operating component) for removing the interchangeable lens unit 2 from the camera body 3 is provided to the front face of the camera body 3. The lens removal button 99 has a switch 97 (discussed below) that is in its "on" state when the button is pressed by the user, for example, and is electrically connected to the body microcomputer 10. When the lens removal button 99 is pressed, the switch 97 goes on, and there is a change in the signal voltage of the circuit that includes the switch 97. The body microcomputer 10 recognizes that the lens removal button 99 has been pressed by detecting this change in signal voltage.

A display button 37 (an example of a display operating component) is used to switch the display state of a liquid crystal monitor 20. Various settings can be displayed on the liquid crystal monitor 20, or a real-time image of a subject (hereinafter also referred to as a live image) can be forcibly displayed on the liquid crystal monitor 20 (or a viewfinder 38), for example, by pressing the display button 37.

(4) Image Acquisition Component

The image acquisition unit 35 mainly has a CCD (charge coupled device) or other such imaging sensor 11 (an example of an imaging element) that performs opto-electric conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 11.

The imaging sensor 11 is, for example, a CCD (charge coupled device) sensor that converts the optical image formed by the optical system L into an electrical signal. The drive of the imaging sensor 11 is controlled by a timing signal generated by the imaging sensor drive controller 12. The imaging sensor 11 may instead be a CMOS (complementary metal oxide semiconductor) sensor.

The shutter controller 31 drives a shutter drive actuator 32 and operates the shutter unit 33 according to a control signal outputted from the body microcomputer 10 that has received a timing signal.

The auto-focus method that is employed in this embodiment is a contrast detection method that makes use of image data produced by the imaging sensor 11. Using a contrast detection method allows high-precision focal adjustment. Also, since no quick return mirror (an example of a mirror) is provided between the body mount 4 and the imaging sensor 11, the camera body 3 can be smaller in size.

(5) Body Microcomputer

The body microcomputer 10 is a control device that is the command center of the camera body 3, and controls the various components of the digital camera 1 according to operation information inputted to the operating unit 39. More specifically, the body microcomputer 10 is equipped with a CPU, ROM, and RAM, and the programs held in the ROM are read by the CPU, allowing the body microcomputer 10 to perform a variety of functions. For instance, the body microcomputer 10 has the function of detecting that the interchangeable lens unit 2 has been mounted to the camera body 3, or the function of acquiring from the interchangeable lens unit 2 focal length information and other such information that is necessary for controlling the digital camera 1.

The body microcomputer 10 is able to receive signals from the power switch 25, the shutter button 30, the mode selector dial 26, the directional arrow key 27, the menu setting button 28, and the set button 29. Various information related to the camera body 3 is held in a memory 10a inside the body microcomputer 10. The memory 10a is a nonvolatile memory, and can hold stored information even when the power supply has been halted.

Also, the body microcomputer 10 periodically produces a vertical synchronization signal, and produces an exposure synchronization signal on the basis of the vertical synchronization signal in parallel with the production of the vertical synchronization signal. The body microcomputer 10 can produce an exposure synchronization signal, since the body microcomputer 10 ascertain beforehand the exposure start timing and the exposure stop timing based on the vertical synchronization signal. The body microcomputer 10 outputs a vertical synchronization signal to a timing generator (not shown), and outputs an exposure synchronization signal at a specific period to the lens microcomputer 40 via the body mount 4 and the lens mount 95. The lens microcomputer 40 acquires position information about the focus lens unit 75 in synchronization with the exposure synchronization signal.

The imaging sensor drive controller 12 produces an electronic shutter drive signal and a read signal of the imaging sensor 11 at a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer component (not shown) the pixel data produced by numerous opto-electrical conversion elements (not shown) present in the imaging sensor 11, according to the read signal.

The body microcomputer 10 also controls a focus adjusting unit 72 (discussed below) via the lens microcomputer 40.

The image signal outputted from the imaging sensor 11 is sent from an analog signal processor 13 and successively processed by an A/D converter 14, a digital signal processor 15, a correction processor 23, a buffer memory 16, and an image compressor 17. The analog signal processor 13 subjects the image signal outputted from the imaging sensor 11 to gamma processing or other such analog signal processing. The A/D converter 14 converts the analog signal outputted from the analog signal processor 13 into a digital signal. The digital signal processor 15 subjects the image signal converted into a digital signal by the A/D converter 14 to digital signal processing such as noise elimination or contour enhancement.

The correction processor 23 subjects the image signal that has undergone digital signal processing by the digital signal processor 15 to distortion correction processing, for example. Since the characteristics of distortion vary with the optical system of an interchangeable lens unit, the memory 40a of the lens microcomputer 40 holds various data for distortion correction, and information related to whether or not distortion correction is needed. When the interchangeable lens unit 2 is mounted to the camera body 3, this information is sent from the lens microcomputer 40 of the interchangeable lens unit 2 to the body microcomputer 10.

The buffer memory 16 is a RAM (Random Access Memory), and temporarily stores the image signal. The image signal stored in the buffer memory 16 is sent to and processed by first the image compressor 17 and then an image recorder 18. The image signal stored in the buffer memory 16 is read at a command from an image recording controller 19 and sent to the image compressor 17. The data of the image signal sent to the image compressor 17 is compressed into an image signal according to a command from the image recording controller 19. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 19 to the image recorder 18. When a moving picture is recorded, JPEG can be used to compress a plurality of image signals, compressing an image signal for each frame, and an H.264/AVC method can also be used, in which compression is performed on image signals for a plurality of frames all at once.

The image recorder 18 produces a still picture file or moving picture file that is associated with specific information to be recorded with the image signal, on the basis of a command from the image recording controller 19. The image recorder 18 then records the still picture file or moving picture file on the basis of a command from the image recording controller 19. The image recorder 18 is a removable memory and/or an internal memory, for example. The specific information to be recorded with the image signal includes the date and time the image was captured, focal length information, shutter speed information, aperture value information, and imaging mode information. Still picture files are in Exif® format or a format similar to Exif® format, for example. Moving picture files are in H.264/AVC format or a format similar to H.264/AVC format, for example.

The body microcomputer 10 also has a mounting detector 10d, a correction decision section 10e, and a correction information acquisition section 10f. The mounting detector 10d detects the mounting state of the interchangeable lens unit 2 with respect to the camera body 3. The detection of the mounting state by the mounting detector 10d will be discussed below.

The correction decision section 10e decides whether or not distortion correction processing is needed on the basis of lens information. The correction information acquisition section 10f acquires various distortion correction data held in the memory 40a of the lens microcomputer 40 on the basis of the decision result of the correction decision section 10e. The above-mentioned correction processor 23 subjects the image signal to correction processing on the basis of various data acquired by the correction information acquisition section 10f.

(6) Image Display Unit

The image display unit 36 has the liquid crystal monitor 20 and an image display controller 21 (an example of the display controller). The liquid crystal monitor 20 displays as a visible image the image signal recorded to the buffer memory 16 or the image recorder 18 on the basis of a command from the image display controller 21. Possible display modes on the liquid crystal monitor 20 include a display mode in which only the image signal is displayed as a visible image, and a display mode in which the image signal and information from the time of capture are displayed as a visible image.

(7) Viewfinder

The viewfinder unit 38 is a so-called electrical view finder (EVF) and has a liquid crystal viewfinder 8 that displays the image acquired by the imaging sensor 11, and a viewfinder eyepiece window 9 provided to the rear face of the case 3a. The user looks into the viewfinder eyepiece window 9 to view the image displayed on the liquid crystal viewfinder 8.

(8) Battery

The battery 22 supplies power to the various components of the camera body 3, and also supplies power to the interchangeable lens unit 2 via the lens mount 95. In this embodiment, the battery 22 is a rechargeable battery. The battery 22 may be a dry cell, or may be an external power supply, with which power is supplied from the outside through a power cord.

Tracking Table

Figure 14:
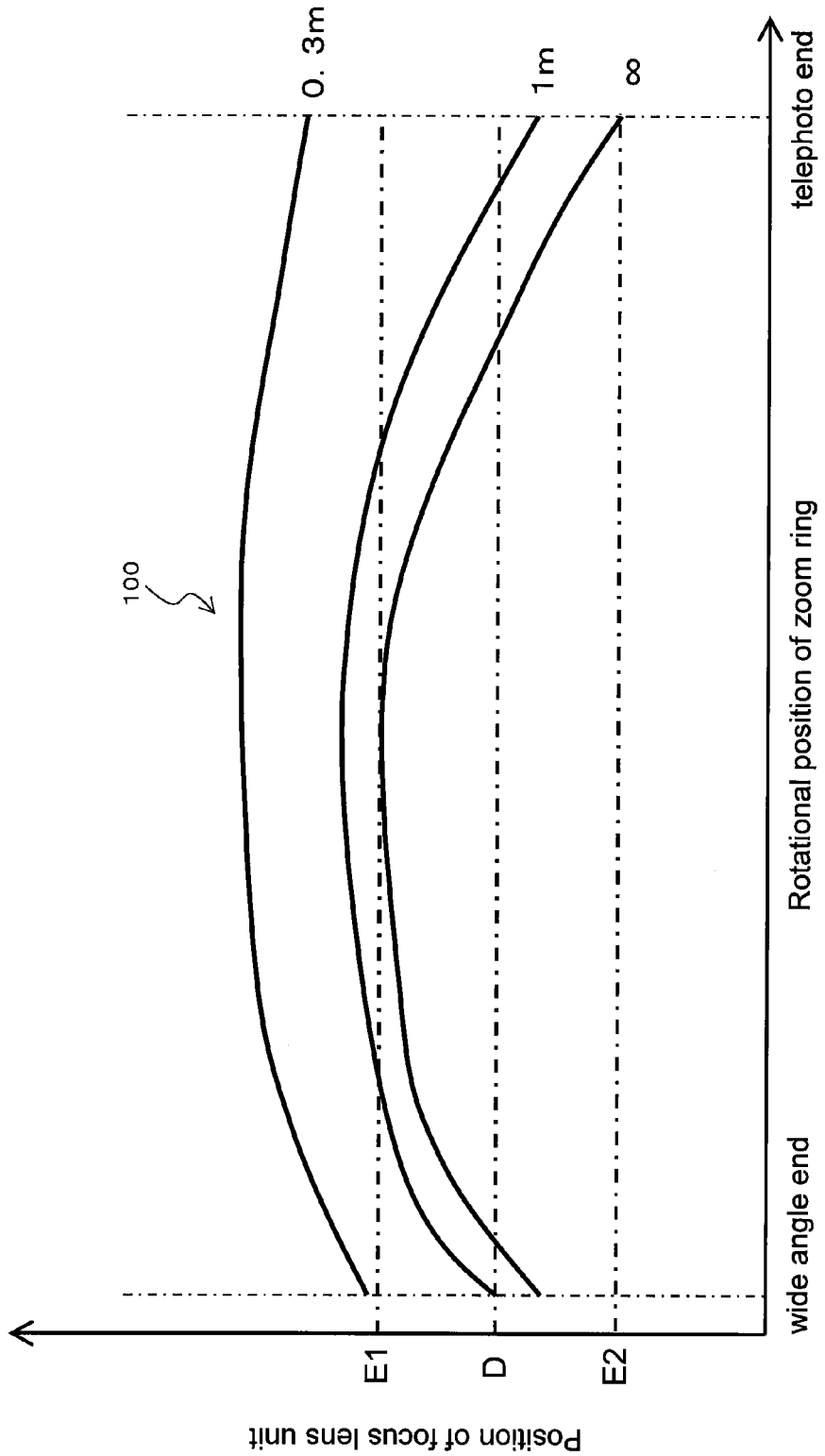
FIG. 14 is a tracking table for realizing a zoom lens system.

With the digital camera 1, electronic tracking is performed by the focus adjusting unit 72 so that the focal length can be varied while the subject distance is kept substantially constant. More specifically, as shown in FIG. 14, to perform electronic tracking, a tracking table 100 is held in the memory 40a. This tracking table 100 shows the relationship between the rotational position of the zoom ring 84 and the position of the focus lens unit 75 in the Z axis direction with respect to the second lens group unit 77. For example, the memory 40a holds three tracking tables 100 corresponding to subject distances of 0.3 m, 1.0 m, and infinity (∞).

The tracking table 100 consists of discrete information in which the rotational position of the zoom ring 84 and the position of the focus lens unit 75 in the Z axis direction are divided into several groups. In general, the number of divisions is determined so that the subject distance will fit within a specific subject field depth even if the zoom ring 84 is turned.

The rotational position of the zoom ring 84 (position in the rotational direction) can be detected by the linear position sensor 87. On the basis of this detection result and the tracking table 100, the lens microcomputer 40 can determine the position of the focus lens unit 75 in the Z axis direction with respect to the second lens group unit 77.

The starting point position D of the focus lens unit 75 with respect to the second lens group unit 77 is detected by the photosensor 67, which is indicated by the one-dot chain line in FIG. 14. In this embodiment, the starting point position D is located near the center of the movement range of the focus lens unit 75 (between positions E1 and E2) in the infinity tracking table 100. Thus disposing the starting point position D near the center allows the focus lens unit 75 to be moved relatively quickly to any position when the power is turned on to the digital camera 1.

The reason the starting point position D is determined using the infinity tracking table 100 as a reference is that there is a higher probability of capturing the subject at the infinity position when the user turns on the power to the digital camera 1 to photograph the subject.

The tracking table 100 may also be expressed by a polynomial, rather than discrete information divided into several groups. Position information about the first lens group G1, second lens group G2, or fourth lens group G4 in the Z axis direction may also be used instead of the rotational position of the zoom ring 84. The "position of the focus lens unit 75 in the Z axis direction with respect to the second lens group unit 77" can be rephrased as the position of the third lens group G3 in the Z axis direction with respect to the second lens group unit 77, or the position of the third lens group G3 in the Z axis direction with respect to the second lens group G2.

Detection of Mounting State of Interchangeable Lens Unit

Figure 15:
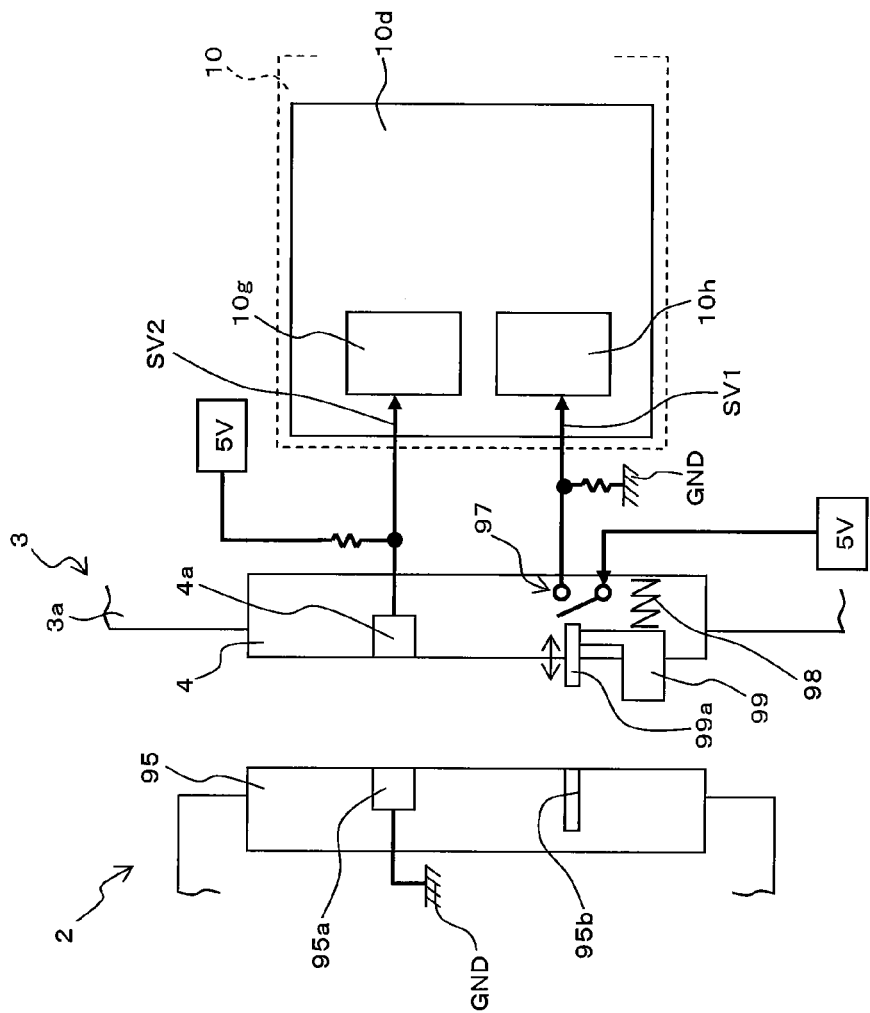
FIG. 15 is a simplified diagram of the configuration of body mount and lens mount surroundings.

With this camera body 3, the display state of the liquid crystal monitor 20 is automatically switched according to the mounting state of the interchangeable lens unit. This display switching function will now be described through reference to FIGS. 15 and 16A to 16D. FIG. 15 is a simplified diagram of the configuration of the body mount 4 and lens mount 95 surroundings. FIGS. 16A to 16D show the mounting states of interchangeable lens units.

(1) Configuration

In order to detect the mounting state of the interchangeable lens unit 2 with respect to the camera body 3, the digital camera 1 has the configuration shown in FIG. 15. More specifically, the body mount 4 or a housing 3a supports the lens removal button 99 of the camera body 3 movably within a specific range in a direction that is along the optical axis AZ, and this button is pushed to the interchangeable lens unit 2 side by a spring 98.

The lens removal button 99 has a lock pin 99a that sticks out from the body mount 4. The lock pin 99a is a portion that restricts the rotation of the interchangeable lens unit 2 with respect to the camera body 3. When the lens removal button 99 is pressed, the lock pin 99a goes inside the body mount 4.

In a state in which the mounting of the interchangeable lens unit 2 is completed, the lock pin 99a is inserted into a lock hole 95b of the lens mount 95. While the interchangeable lens unit 2 is being mounted, the lock pin 99a is pushed by the lens mount 95 into the interior of the body mount 4. Conversely, when the lens mount 95 is pressed against the body mount 4, the lock pin 99a is pushed in, and as a result the lens removal button 99 is also pushed in. That is, the mounting state of the interchangeable lens unit 2 can be detected by detecting the operation state of the lens removal button 99 or the protrusion state of the lock pin 99a.

The switch 97 is built into the body mount 4 in order to detect the state of the lock pin 99a and the lens removal button 99. The switch 97 is a type that is normally open, and is electrically connected to the mounting detector 10d of the body microcomputer 10. More precisely, the switch 97 is electrically connected to a lock pin detector 10g (an example of a first detector) of the mounting detector 10d.

The line of the switch 97 connected to the lock pin detector 10g is also connected to ground (GND). A signal voltage (such as 5 V) is applied to the line on the opposite side of the switch 97. We shall term the line of the switch 97 connected to the lock pin detector 10g the first detection line SV1.

When the lens removal button 99 is pressed, the switch 97 is switched on and the lock pin detector 10g detects that the signal voltage of the first detection line SV1 changes from the ground level (0 V) to 5 V. Similarly, when the lock pin 99a is pushed in, the switch 97 is switched on and the lock pin detector 10g detects a change in the signal voltage at the first detection line SV1. That is, the lens removal button 99 and the lock pin 99a are pushed in when the signal voltage of the first detection line SV1 is 5 V.

Meanwhile, when the lens removal button 99 is no longer pressed, the lens removal button 99 stops in a state of being pushed out by the pressing force of the spring 98, and the switch 97 is switched off. In this state, the signal voltage detected at the first detection line SV1 by the lock pin detector 10g falls to the ground level. If the signal voltage of the first detection line SV1 is at the ground level, the lens removal button 99 and the lock pin 99a are not being pushed in.

Thus, the mounting detector 10d can recognize the operation state of the lens removal button 99, and can also recognize the protrusion state of the lock pin 99a, when the level of the signal voltage of the first detection line SV1 is detected by the lock pin detector 10g.

Whether or not the interchangeable lens unit 2 has been mounted to the camera body 3 can be detected by terminals provided to the body mount 4 and the lens mount 95. More specifically, a body-side terminal 4a is provided to the body mount 4, and a lens-side terminal 95a is provided to the lens mount 95. The body-side terminal 4a is electrically connected to a lens detector 10h (an example of a second detector) of the mounting detector 10d. Signal voltage (such as 5 V) from a battery 22 is applied to the line that connects the body-side terminal 4a and the lens detector 10h. The lens-side terminal 95a is connected to ground (GND). Voltage (such as 5 V) from the battery 22 is applied to the body-side terminal 4a. The line of the body-side terminal 4a shall be termed the second detection line SV2.

When the lens detector 10h detects signal voltage at the second detection line SV2, the body-side terminal 4a is not in contact with the lens-side terminal 95a. When the body-side terminal 4a comes into contact with the lens-side terminal 95a, the signal voltage detected at the second detection line SV2 drops to the ground level.

Thus, by detecting the level of the signal voltage of the second detection line SV2 with the lens detector 10h, the body microcomputer 10 can detect whether or not the body-side terminal 4a and the lens-side terminal 95a are touching, and can detect whether or not the interchangeable lens unit 2 has been mounted to the camera body 3.

Even though the body-side terminal 4a may be in contact with the lens-side terminal 95a, the interchangeable lens unit 2 is not necessarily completely mounted to the camera body 3, but at least whether or not the body mount 4 and the lens mount 95 are in contact can be decided by monitoring the signal voltage of the second detection line SV2 with the lens detector 10h.

The mounting state of the interchangeable lens unit 2 with respect to the camera body 3 can be determined on the basis of the two kinds of signal voltage described above.

(2) Detection During Interchangeable Lens Unit Mounting

Figure 16A:
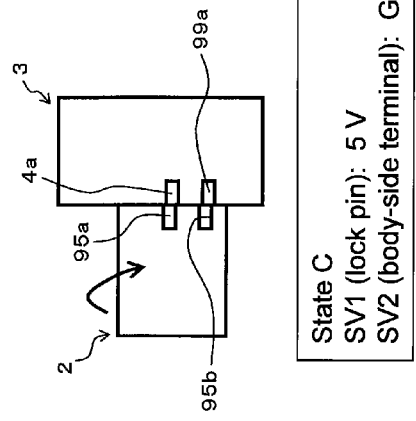
FIGS. 16A to 16D show the mounting states of interchangeable lens units.

For example, as shown in FIG. 16A, in a state in which the interchangeable lens unit 2 has been completely removed from the camera body 3, the signal voltage of the first detection line SV1 is the ground level, and the signal voltage of the second detection line SV2 is 5 V. the state shown in FIG. 16A shall be termed state A.

Figure 16B:
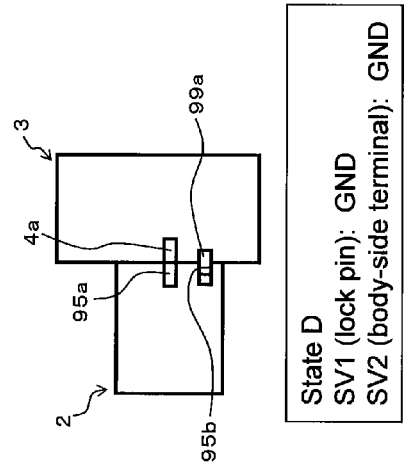

For instance, when the interchangeable lens unit 2 is mounted to the camera body 3, the lens mount 95 is fitted into the body mount 4. More specifically, a plurality of tabs (not shown) are provided to the lens mount 95, and a plurality of grooves (not shown) into which the tabs are inserted in the rotational direction are provided to the body mount 4. When the interchangeable lens unit 2 is rotated clockwise with respect to the camera body 3 in a state in which the lens mount 95 is pressed against the body mount 4, the tabs fit into the grooves, and movement of the interchangeable lens unit 2 in a direction along the optical axis AZ with respect to the camera body 3 is restricted. At this point, as shown in FIG. 16B, since the lock pin 99a is pushed in by the lens mount 95, the signal voltage of the first detection line SV1 changes to 5 V, and a change in the signal voltage is detected by the lock pin detector 10g. Consequently, the start of the mounting of the interchangeable lens unit 2 can be detected.

In state B, the body-side terminal 4a is not touching the lens-side terminal 95a, so the signal voltage of the second detection line SV2 is 5 V.

When the interchangeable lens unit 2 is further rotated with respect to the camera body 3, the body-side terminal 4a touches the lens-side terminal 95a. As a result, the signal voltage of the second detection line SV2 changes from 5 V to the ground level. That is, when the signal voltage of the first detection line SV1 is 5 V, and the signal voltage of the second detection line SV2 is the ground level, the mounting state of the interchangeable lens unit 2 is the state C shown in FIG. 16C.

When the interchangeable lens unit 2 is rotated further, the lock pin 99a is inserted into the lock hole 95b (discussed below) of the lens mount 95, and rotation of the interchangeable lens unit 2 around the optical axis AZ with respect to the camera body 3 is restricted. A state in which the lock pin 99a has been inserted into the lock hole 95b is a state in which the interchangeable lens unit 2 has been completely mounted to the camera body 3. At this point, since the lock pin 99a is inserted into the lock hole 95b, the signal voltage of the first detection line SV1 changes from 5 V to the ground level. That is, when the signal voltage of the first detection line SV1 is at the ground level, and the signal voltage of the second detection line SV2 is at the ground level, the mounting state of the interchangeable lens unit 2 is the state D shown in FIG. 16D.

(3) Detection Operation During Removal of Interchangeable Lens Unit

When the interchangeable lens unit 2 is removed from the camera body 3, the lens removal button 99 is pushed in, and the lock pin 99a is pushed into the body mount 4. At this point, since the signal voltage of the first detection line SV1 changes from ground level to 5 V, the mounting detector 10d can recognize the start of removal of the interchangeable lens unit 2 when the lock pin detector 10g detects a change in the signal voltage.

Thereafter, changes in the states A to D can be detected by detecting the signal voltage of the first detection line SV1 and the second detection line SV2.

Operation of Digital Camera

The operation of the digital camera 1 will be described.

(1) Imaging Mode

This digital camera 1 has two imaging modes. More specifically, the digital camera 1 has a viewfinder imaging mode in which the user looks through the viewfinder eyepiece window 9 to view the subject, and a monitor imaging mode in which the user observes the subject on the liquid crystal monitor 20.

With the viewfinder imaging mode, the image display controller 21 drives the liquid crystal viewfinder 8, for example. As a result, an image of the subject (a so-called through-image) acquired by the imaging sensor 11 is displayed on the liquid crystal viewfinder 8.

With the monitor imaging mode, the liquid crystal monitor 20 is driven by the image display controller 21, for example, and a real-time image of the subject is displayed on the liquid crystal monitor 20. Switching between these two imaging modes can be performed with the imaging mode selector button 34.

(2) Zoom Operation

Next, the operation of the interchangeable lens unit 2 when the user performs zooming will be described.

When the user rotates the zoom ring 84, the cam barrel 51 rotates along with the zoom ring 84. When the cam barrel 51 rotates around the optical axis AZ, the first holder 52 is guided by the first cam grooves 51d of the cam barrel 51, and advances in the Z axis direction. The second holder 55 and the fourth lens group support frame 61 are also guided by the second cam grooves 51b and the third cam grooves 51c of the cam barrel 51, and advance in the Z axis direction. Thus, by rotating the zoom ring 84, the state of the interchangeable lens unit 2 can be changed from the wide angle end state shown in FIGS. 5 and 6 to the telephoto end state shown in FIGS. 7 and 8. Consequently, the subject can be imaged at the desired zoom position by adjusting the rotational position of the zoom ring 84.

The second holder 55 is mechanically driven in the Z axis direction by rotating the zoom ring 84 here, but only the focus lens unit 75 is electrically driven and controlled by the focus adjusting unit 72 on the basis of the tracking table 100 stored ahead of time in the memory 40a, so that the subject distance remains substantially constant. For example, when the focus lens unit 75 is driven by the focus motor 64 on the basis of the tracking table 100, the focal state can be kept at infinity both when the move is from the wide angle end to the telephoto end, and when the move is from the telephoto end to the wide angle end.

More precisely, when the zoom ring 84 is turned, the first lens group G1, the second lens group G2, the third lens group G3, and the fourth lens group G4 move in the Z axis direction along the optical axis AZ. Consequently, the magnification of the subject image changes. At this point the third lens group G3 also moves in the Z axis direction along the optical axis AZ in a state of being supported by the second holder 55 via the third lens group support frame 56. When there is a relative change in the positional relationship of the first lens group G1, the second lens group G2, the third lens group G3, and the fourth lens group G4, the focal state of the subject image formed on the imaging sensor 11 also changes. That is, the subject distance at which the focal point is formed on the imaging sensor 11 changes.

In view of this, with the digital camera 1, even if the focal length changes, the subject distance can be kept substantially constant by driving the focus motor 64 according to the rotational position of the zoom ring 84. More specifically, using just the focus motor 64, the focus lens unit 75 including the third lens group G3 is driven with respect to the second lens group unit 77. The lens microcomputer 40 acquires the rotational position of the zoom ring 84 on the basis of the detection signal of the linear position sensor 87. At the same time, the lens microcomputer 40 calculates the position of the focus lens unit 75 with respect to the second lens group unit 77 from the count value at the counter 40b. Utilizing the plurality of tracking tables 100 shown in FIG. 14, the lens microcomputer 40 finds the current subject distance from these two pieces of information (the current rotational position of the zoom ring 84, and the position of the focus lens unit 75 with respect to the second lens group unit 77), and selects the tracking table 100 corresponding to the subject distance thus found. Here, we will assume that the tracking table 100 corresponding to infinity was selected.

Next, the lens microcomputer 40 again acquires the rotational position of the zoom ring 84, and finds the rotational speed of the zoom ring 84, that is, the rate of change in the focal length, from the amount of change in the rotational position of the zoom ring 84.

Next, the lens microcomputer 40 predicts the rotational position of the zoom ring 84 after the elapse of a specific time from the current rotational angle of the zoom ring 84 and the rotational speed of the zoom ring 84, and finds as a target position the position of the focus lens unit 75 in the Z axis direction corresponding to the predicted rotational position of the zoom ring 84. After the elapse of a specific time, the lens microcomputer 40 drives the focus motor 64 via the focus drive controller 41 so that the focus lens unit 75 will be located at this target position. Consequently, the focus lens unit 75 is driven so as to follow the movement of the other lens groups, and the subject distance is kept constant.

Thus, in the electronic tracking operation, the lens microcomputer 40 predicts the change in the focal length that will accompany zooming operation, and acquires from the tracking table 100 the target position of the focus lens unit 75 corresponding to the predicted focal length. The focus lens unit 75 is driven to the target position by the focus motor 64 in parallel with the zooming operation of the optical system L. Since this operation is executed at specific time intervals, even if the zoom ring 84 is rotated and the focal length of the optical system L changes, the focus lens unit 75 will move to the Z axis direction position corresponding to the focal length on the basis of the tracking table 100, and the drive of the focus lens unit 75 can conform to the change in the focal length. Consequently, the subject distance can be kept substantially constant regardless of any change in the focal length. The control of these components may be performed by the body microcomputer 10, rather than lens microcomputer 40.

Similarly, when the focused subject distance is short, such as 1 m, for example, the tracking table 100 for which the subject distance is 1 m is selected, and both when the move is from the wide angle end to the telephoto end, and when the move is from the telephoto end to the wide angle end, the focused state at a short distance can be maintained by driving the focus motor 64, and the zooming operation can be carried out smoothly.

In particular, since the focus lens unit 75 and the focus motor 64 move in the Z axis direction integrally with the second lens group unit 77, even if the user turns the zoom ring 84 quickly, the focus lens unit 75 can still be moved integrally with the second lens group unit 77. Therefore, if the subject distance is to be kept substantially constant before and after the zooming operation, the focus motor 64 may move the third lens group G3 by a distance obtained by subtracting the distance that the second lens group G2 is moved by the cam mechanism with respect to the imaging sensor 11 from the distance that the third lens group G3 is to be moved with respect to the imaging sensor 11. This makes it easy to keep up with fast operation of the zoom ring 84 by the user.

Also, in this embodiment, if a zooming operation is performed from the wide angle end to the telephoto end, with the subject distance at infinity, the focus lens unit 75 (more precisely, the third lens group G3, which is a focus lens group) must be moved in the Z axis direction by about 10 mm with respect to the imaging sensor 11. When the focus motor 64 is driven at 3000 pps, the amount of drive of the focus lens unit 75 per rotation of the focus motor 64 is 0.3 mm as mentioned above, so it takes approximately 0.4 second to move the focus lens unit 75 by 3 mm in the Z axis direction on the basis of the tracking table. Since it is possible to move the focus lens unit 75 from the wide angle end to the telephoto end in approximately 0.4 second, even if the user should turn the zoom ring 84 from the wide angle end to the telephoto end in 0.5 second, the drive of the focus lens unit 75 can keep up with the change in focal length. Consequently, even if the user should perform a quick zooming operation while looking at the subject on the liquid crystal monitor 20 in live view mode, for example, the subject image that shows on the liquid crystal monitor 20 will be unlikely to be blurred, and this makes the camera easier to use.

(3) Focusing Operation

Next, the focusing operation of the digital camera 1 will be described. The digital camera 1 has two focus modes: an auto-focus imaging mode and a manual imaging mode. The user of the digital camera 1 can select the focus mode with a focus imaging mode setting button (not shown) provided to the camera body 3.

In the auto-focus imaging mode, auto-focus operation is performed by contrast detection method. When auto-focusing is performed by contrast detection method, the body microcomputer 10 asks the lens microcomputer 40 for contrast AF data. This contrast AF data is necessary in auto-focusing by contrast detection method, and includes, for example, the focus drive speed, focus shift amount, image magnification ratio, and information about whether contrast AF is possible.

The body microcomputer 10 monitors whether or not the shutter button 30 has been pressed half way down. If the shutter button 30 has been pressed half way down, the body microcomputer 10 issues an auto-focus commencement command to the lens microcomputer 40. This auto-focus commencement command is to start the auto-focus operation by contrast detection method. Upon receiving this command, the lens microcomputer 40 drives and controls the focus motor 64, which is a focus actuator. More precisely, the lens microcomputer 40 sends a control signal to the focus drive controller 41. On the basis of this control signal, the focus drive controller 41 drives the focus motor 64, and the focus lens unit 75 moves minutely.

The body microcomputer 10 calculates an evaluation value for auto-focus operation (hereinafter referred to as an AF evaluation value) on the basis of the received image data. More specifically, the body microcomputer 10 sends a command to the digital signal processor 15. The digital signal processor 15 sends an image signal to the body microcomputer 10 at a specific timing on the basis of the received command. The body microcomputer 10 finds a brightness signal from the image data produced by the imaging sensor 11, and finds the AF evaluation value by integrating the high-frequency component within the screen of the brightness signal. The AF evaluation value thus calculated is stored in a DRAM (not shown) in a state of being associated with the exposure synchronization signal. Since the lens position information acquired by the body microcomputer 10 from the lens microcomputer 40 is also associated with the exposure synchronization signal, the body microcomputer 10 can store the AF evaluation value with it associated with the lens position information.

Next, the body microcomputer 10 extracts as the focal point the position of the focus lens unit 75 where the AF evaluation value is at its maximum, on the basis of the AF evaluation value stored in the DRAM. The method for driving the focus lens unit 75 in the extraction of the focal point is generally known as a hill climbing method. With a hill climbing method, the focus lens unit 75 is moved in the direction of increasing the AF evaluation value, and the AF evaluation value is found for each position of the focus lens unit 75. This operation is continued until the maximum value for the AF evaluation value is detected, that is, until the AF evaluation value increases up to its peak and begins to decrease.

The body microcomputer 10 sends a control signal to the focus drive controller 41 via the lens microcomputer 40 so that the focus lens unit 75 will be driven to the position corresponding to the extracted focal point. The focus drive controller 41 produces a drive pulse for driving the focus motor 64 on the basis of a control signal from the body microcomputer 10 (or the lens microcomputer 40), for example. The focus motor 64 is driven by an amount corresponding to this drive signal, and the focus lens unit 75 moves in the Z axis direction to the position corresponding to the focal point.

Focusing in auto-focus imaging mode is performed in this way with the digital camera 1. The above operation is executed instantly when the user presses the shutter button 30 half way down.

Focusing by contrast detection method can also be carried out in monitor imaging mode (known as viewfinder mode), in which real-time image data can be produced with the imaging sensor 11. The reason for this is that in viewfinder mode, image data is produced in a steady state by the imaging sensor 11, and auto-focusing by contrast detection method using this image data is easy.

In viewfinder mode, since a real-time image of the subject is displayed on the liquid crystal monitor 20, the user can decide on the composition for taking the still picture or moving picture while looking at the liquid crystal monitor 20. Also, there is another imaging mode the user can select in addition to live view mode using the liquid crystal monitor 20, which is a second live view mode (viewfinder imaging mode) in which the subject image from the interchangeable lens unit 2 is guided to the liquid crystal viewfinder 8 (viewfinder unit 38).

The manual focus imaging mode will now be described.

When the user turns the focus ring 89, the focus ring angle detector 90 detects the rotational angle of the focus ring 89 and outputs a signal corresponding to this rotational angle. The focus drive controller 41 is able to receive signals from the focus ring angle detector 90, and able to send signals to the focus motor 64. The focus drive controller 41 sends the decision result to the lens microcomputer 40. The focus drive controller 41 drives the focus motor 64 on the basis of a control signal from the lens microcomputer 40. More precisely, the lens microcomputer 40 produces a drive signal for driving the focus motor 64 on the basis of a focus ring rotational angle signal. When the lead screw 64a of the focus motor 64 rotates according to the drive signal, the focus lens unit 75 moves in the Z axis direction via the rack 66 that meshes with the lead screw 64a. In the wide angle end state shown in FIGS. 5 and 6, the subject distance is infinity, but as the subject distance draws closer, the focus lens unit 75 moves to the Z axis direction positive side. Similarly, in the telephoto end state shown in FIGS. 7 and 8, the subject distance is infinity, but as the subject distance becomes shorter, the focus lens unit 75 moves to the Z axis direction positive side. The amount of movement of the focus lens unit 75 is greater in this case than in the case of the wide angle end.

In this way, the user can perform focusing by turning the focus ring 89 while looking at the subject on the liquid crystal monitor 20. In the manual focus imaging mode, when the user presses the shutter button 30 all the way down, imaging is performed in this unchanged state.

(4) Still Picture Imaging

When the user presses the shutter button 30 all the way down, a command is sent from the body microcomputer 10 to the lens microcomputer 40 so that the aperture value of the optical system L will be set to the aperture value calculated on the basis of the light measurement output of the imaging sensor 11. The aperture drive controller 42 is controlled by the lens microcomputer 40, and the aperture unit 62 is constricted to the indicated aperture value. Simultaneously with the indication of the aperture value, a drive command is sent from the imaging sensor drive controller 12 to the imaging sensor 11, and a shutter unit 33 drive command is sent out. The imaging sensor 11 is exposed by the shutter unit 33 for a length of time corresponding to the shutter speed calculated on the basis of the light measurement output of the imaging sensor 11.

The body microcomputer 10 executes imaging processing and, when the imaging is completed, sends a command signal to the image recording controller 19. The image recorder 18 records an image signal to an internal memory and/or removable memory on the basis of the command of the image recording controller 19. The image recorder 18 records imaging mode information (whether auto-focus imaging mode or manual focus imaging mode) along with the image signal to the internal memory and/or removable memory on the basis of the command of the image recording controller 19.

Upon completion of the exposure, the imaging sensor drive controller 12 reads image data from the imaging sensor 11, and after specific image processing, image data is outputted via the body microcomputer 10 to the image display controller 21. Consequently, the captured image is displayed on the liquid crystal monitor 20.

Also, upon completion of the exposure, the shutter unit 33 is reset to its initial position by the body microcomputer 10. The body microcomputer 10 issues a command to the lens microcomputer 40 for the aperture drive controller 42 to reset the aperture unit 62 to its open position, and a reset command is sent from the lens microcomputer 40 to the various units. Upon completion of this resetting, the lens microcomputer 40 tells the body microcomputer 10 that resetting is complete. After the resetting completion information has been received from the lens microcomputer 40, and after a series of post-exposure processing has been completed, the body microcomputer 10 confirms that the shutter button 30 is not being pressed, and the imaging sequence is concluded.

(5) Moving Picture Capture

The digital camera 1 also has the function of capturing moving pictures. In moving picture imaging mode, image data is produced by the imaging sensor 11 at a specific period, and the image data thus produced is utilized to continuously carry out auto-focusing by contrast detection method. In moving picture imaging mode, if the shutter button 30 is pressed, or if the moving picture capture operation button 24 is pressed, a moving picture is recorded to the image recorder 18, and when the shutter button 30 or the moving picture capture operation button 24 is pressed again, recording of the moving picture by the image recorder 18 is stopped.

(6) Operation During Interchangeable Lens Unit Mounting

Figure 17:
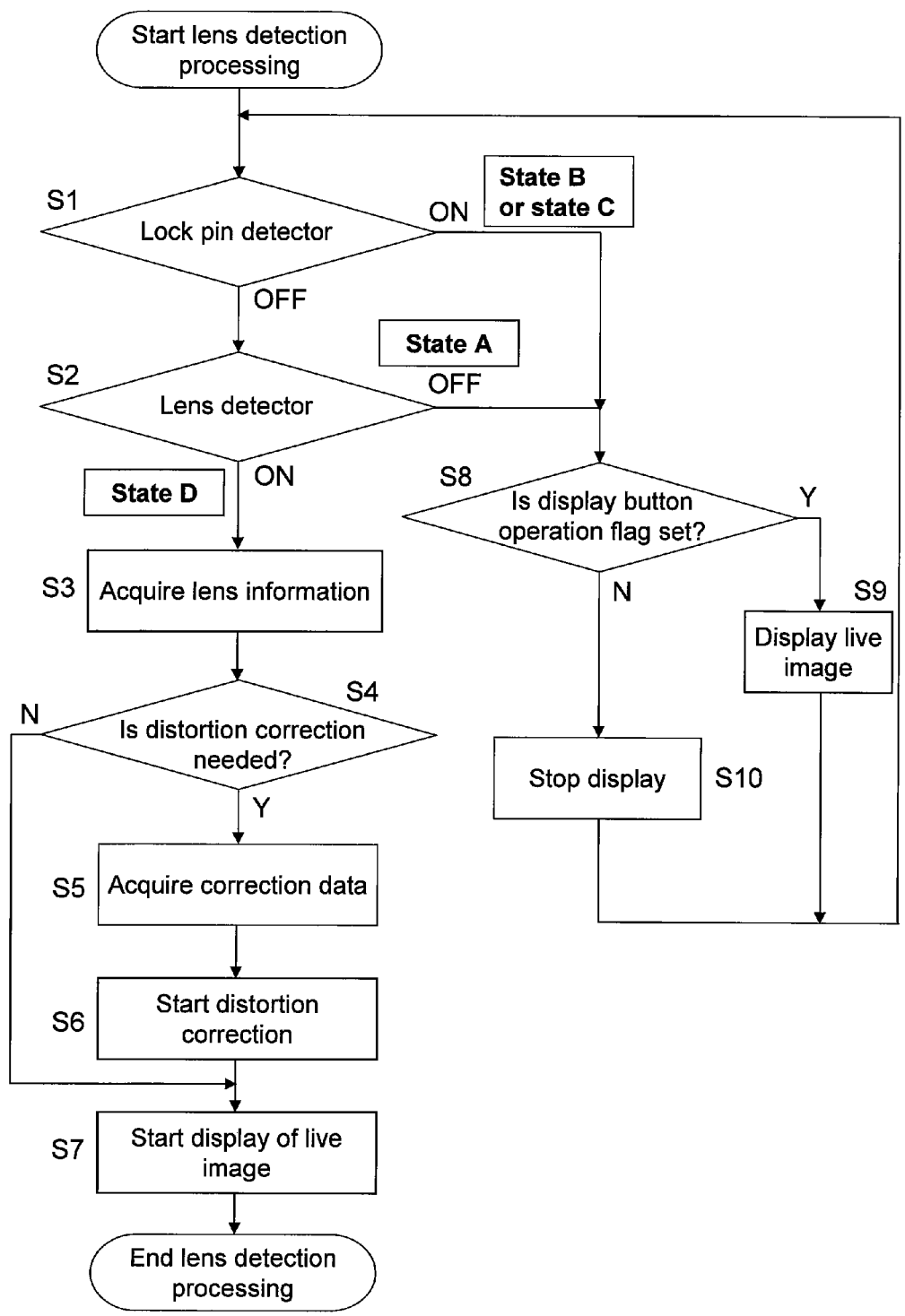
FIG. 17 is a flowchart of lens detection processing (first embodiment)

The operation during the mounting of the interchangeable lens unit will be described through reference to FIG. 17. FIG. 17 is a flowchart of the camera body 3 when the interchangeable lens unit 2 is mounted to the camera body 3, or when it is removed. Here, we will describe the flow when the interchangeable lens unit 2 is mounted to the camera body 3. Also, we will assume a case in which live view mode using the liquid crystal monitor 20 has been selected as the imaging mode.

When the power is on to the camera body 3 in a state in which the interchangeable lens unit 2 has not been mounted, the shutter speed or any of various other setting values is displayed on the liquid crystal monitor 20, for example. In this state, the state of the lens removal button 99 is monitored by the lock pin detector 10g of the mounting detector 10d (S1). In a state in which the lens removal button 99 and the lock pin 99a have not been pushed in (OFF), the switch 97 is in its off state, so the signal voltage of the first detection line SV1 is at the ground level.

When the interchangeable lens unit 2 is mounted to the camera body 3, the lens mount 95 is pressed against the body mount 4. At this point, the lock pin 99a is pushed by the lens mount 95 into the body mount 4, and the switch 97 is switched on. As a result, the signal voltage of the first detection line SV1 changes from ground level to 5 V. The mounting detector 10d can detect that mounting of the interchangeable lens unit 2 has begun when the lock pin detector 10g detects this change in the signal voltage.

When the lock pin detector 10g has detected that the lock pin 99a has been pushed in, the body microcomputer 10 confirms the operation state of the display button 37 (S8). More specifically, when the display button 37 is pressed, a display button operation flag is set in the memory 10a of the body microcomputer 10. When the display button 37 is pressed in a state in which a display button operation flag has been set, the display button operation flag is cleared. The status of this display button operation flag is confirmed by the body microcomputer 10.

If no display button operation flag has been set, display on the liquid crystal monitor 20 is stopped (S10). More specifically, a control signal is sent from the body microcomputer 10 to an image display controller 21 to the effect that display on the liquid crystal monitor 20 is to be stopped. The display state of the liquid crystal monitor 20 is switched by the image display controller 21 on the basis of this control signal, from a specific display state in which various setting values are displayed to a displayed stopped state (known as a black-out state). Thus, when the mounting state of the interchangeable lens unit 2 is incomplete, the image display controller 21 basically prohibits the display of a live image of the subject on the liquid crystal monitor 20. In viewfinder imaging mode using the viewfinder 38, the image display controller 21 prohibits the display of a live image of a subject on a liquid crystal viewfinder 8.

Meanwhile, when the display button 37 is pressed in a state in which the lock pin 99a has been pushed in, a display button operation flag is set. If a display button operation flag has been set, a live image is displayed on the liquid crystal monitor 20 regardless of the detection result from the mounting detector 10d (S9). More specifically, the body microcomputer 10 sends the image display controller 21a control signal to the effect that a live image is to be displayed on the liquid crystal monitor 20. At the same time, the body microcomputer 10 sends the imaging sensor drive controller 12 a control signal to the effect that an image signal is to be provided by the imaging sensor 11. As a result, a live image is displayed on the liquid crystal monitor 20 on the basis of the image signal produced by the imaging sensor 11. The image displayed at this stage is not subjected to distortion correction processing. The reason is that various data for distortion correction will be brought into the body microcomputer 10 at the point when the mounting of the interchangeable lens unit 2 is complete. Thus, even though the mounting of the interchangeable lens unit 2 is in an incomplete state, if a display button operation flag has been set, then a live image of the subject is displayed on the liquid crystal monitor 20 (or the liquid crystal viewfinder 8 in viewfinder imaging mode).

After steps S9 and S10, the state of the lock pin 99a is again checked by the lock pin detector 10g (S1). If the lock pin 99a has been pushed in, then steps S8 to S10 are repeated. Thus, when the display button 37 is not pressed in a state in which the lock pin 99a is pushed in, a state in which nothing at all is displayed on the liquid crystal monitor 20 is maintained.

When the interchangeable lens unit 2 is rotated with respect to the camera body 3 in a state in which the lens mount 95 is pressed against the body mount 4, the tabs on the lens mount 95 are fitted into the grooves in the body mount 4, and movement of the interchangeable lens unit 2 in a direction along the optical axis AZ with respect to the camera body 3 is restricted. When the interchangeable lens unit 2 is further rotated with respect to the camera body 3, the pressing force of the spring 98 causes the lock pin 99a to be fitted into the lock hole 95b of the lens mount 95. Consequently, rotation of the interchangeable lens unit 2 with respect to the camera body 3 is restricted, and mounting of the interchangeable lens unit 2 is complete.

When the lock pin 99a is fitted into the lock hole 95b, the switch 97 is switched off, and the signal voltage of the first detection line SV1 changes from 5 V to the ground level. This change in the signal voltage is detected by the lock pin detector 10g. When the lock pin detector 10g detects this change in the signal voltage, the lens detector 10h of the mounting detector 10d confirms whether or not the body-side terminal 4a is touching the lens-side terminal 95a (S1, S2). The purpose of confirming the contact state of these terminals is to determine whether the mounting state of the interchangeable lens unit 2 is state A or state D.

The signal voltage of the second detection line SV2 is detected by the mounting detector 10d, and the mounting detector 10d then decides whether or not the body-side terminal 4a is touching the lens-side terminal 95a. If the signal voltage of the second detection line SV2 is higher than the ground level, the body-side terminal 4a is not touching the lens-side terminal 95a, so it can be decided that the mounting state of the interchangeable lens unit 2 is the state A shown in FIG. 16A. In this case, since it is possible that the user stopped the mounting of the interchangeable lens unit 2 midway and removed the interchangeable lens unit 2 from the camera body 3, the operation state of the display button 37 is checked (S8), and the display on the liquid crystal monitor 20 is stopped (S10) or a live image is displayed on the liquid crystal monitor 20 (S9), according to the status of the display button operation flag. Monitoring of the state of the lock pin 99a is continued by the mounting detector 10d (S1).

Figure 16C:
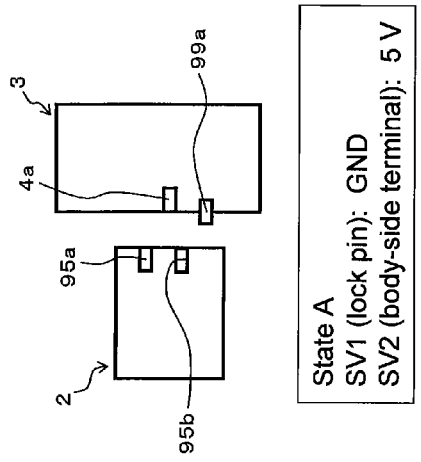
Figure 16D:
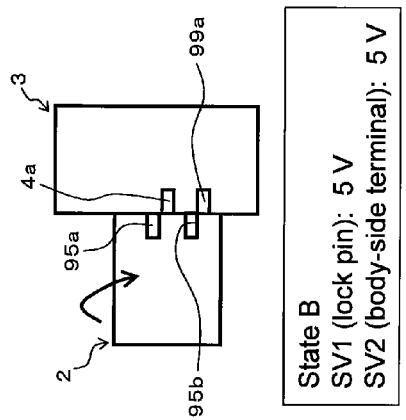

Meanwhile, in step S2, when the signal voltage of the second detection line SV2 is at the ground level, the body-side terminal 4a is touching the lens-side terminal 95a, so it can be decided that the mounting state of the interchangeable lens unit 2 is the state D shown in FIG. 16D. In this case, lens information held in the memory 40a of the lens microcomputer 40 is acquired by the body microcomputer 10 and temporarily stored in the memory 10a (S3). Since this lens information includes information related to whether or not distortion correction processing is needed, the correction decision section 10e decides whether or not distortion correction processing is needed on the basis of this lens information (S4). If the correction decision section 10e decides that distortion correction processing is needed, then various data related to distortion correction held in the memory 40a is acquired by the correction information acquisition section 10f and temporarily stored in the memory 10a (S5). The image signal is subjected to distortion correction processing by the correction processor 23 on the basis of this data, and an image is displayed on the liquid crystal monitor 20 on the basis of the image signal (S6, S7).

Thus, in a state in which the interchangeable lens unit 2 has been completely mounted to the camera body 3, the display of the subject as a live image on the liquid crystal monitor 20 (or the liquid crystal viewfinder 8 in the case of viewfinder imaging mode) is permitted by the image display controller 21.

On the other hand, if the correction decision section 10e decides that distortion correction is not needed, then a live image that has not undergone distortion correction processing is displayed on the liquid crystal monitor 20 (S7). After the start of display of the live image, the state of the lens removal button 99 and the lock pin 99a is monitored by the mounting detector 10d (S1).

(7) Operation During Interchangeable Lens Unit Removal

The flow shown in FIG. 17 also shows the operation during the removal of the interchangeable lens unit 2. For example, when the interchangeable lens unit 2 is removed from the camera body 3, the lens removal button 99 is pressed, and the locking provided by the lock pin 99a is released. At this point the state of the lens removal button 99 and the lock pin 99a is being monitored in step S1, so when the lock pin detector 10g detects that the lens removal button 99 has been pressed, the state of the display button operation flag is checked (S8), and if no flag has been set, the display on the liquid crystal monitor 20 is stopped (S10). If a flag has been set, a live image is displayed on the liquid crystal monitor 20 (S9). After this, the monitoring of the state of the lens removal button 99 and the lock pin 99a by the lock pin detector 10g is continued again (S1).

If it is decided in step S1 that the lock pin 99a has not been pushed in, then the mounting state of the interchangeable lens unit 2 is state A or D, so the connection state of the body-side terminal 4a and the lens-side terminal 95a is checked by the lens detector 10h (S2). If the body-side terminal 4a and the lens-side terminal 95a are touching, it is possible that the mounting state of the interchangeable lens unit 2 is either a state in which the interchangeable lens unit 2 has been mounted, or a state in which a new interchangeable lens unit has been mounted. Therefore, steps S3 to S7 are executed.

Meanwhile, if in step S2 the body-side terminal 4a is not touching the lens-side terminal 95a, then the interchangeable lens unit 2 has been removed from the camera body 3, so basically the display of the liquid crystal monitor 20 is stopped (S10), and a live image is displayed on the liquid crystal monitor 20 according to the status of the display button operation flag (S9). After this, monitoring of the state of the lock pin 99a is continued by the mounting detector 10d (S1).

Thus, by having the mounting detector 10d detect the signal voltage of the first detection line SV1 and the second detection line SV2, the mounting state of the interchangeable lens unit 2 can be detected, and furthermore the display of a live image of the subject on the liquid crystal monitor 20 (or the liquid crystal viewfinder 8 in the case of viewfinder imaging mode) can be prohibited according to the mounting state of the interchangeable lens unit 2.

Features of Digital Camera

The features of the digital camera 1 described above are as follows.

(1) With this digital camera 1, the mounting state of the interchangeable lens unit 2 with respect to the camera body 3 is detected by the mounting detector 10d. The display of the subject as a live image on the liquid crystal monitor 20 is prohibited by the image display controller 21 on the basis of this detection result. More specifically, when the mounting detector 10d detects that the mounting state of the interchangeable lens unit 2 is incomplete, the image display controller 21 prohibits the display of the subject as a live image on the liquid crystal monitor 20 (or the liquid crystal viewfinder 8 in the case of viewfinder imaging mode). Therefore, if the mounting state of the interchangeable lens unit 2 is incomplete, the user cannot perform framing while looking at the liquid crystal monitor 20. Consequently, accidental imaging when the mounting state of the interchangeable lens unit 2 is incomplete can be more effectively prevented.

In particular, since no quick return mirror is provided between the body mount 4 and the imaging sensor 11, the user can perform framing while looking at the live image displayed on the monitor, no matter whether framing with the liquid crystal monitor 20, or framing with the viewfinder 38. Accordingly, when the display of a live image is prohibited as discussed above, the user ends up being prohibited from framing, and this more effectively prevents accidental imaging in the event that the interchangeable lens unit 2 has not been completely mounted.

Also, if the mounting detector 10d has detected that the interchangeable lens unit 2 is completely mounted to the camera body 3, the image display controller 21 permits the subject to be displayed as a live image on the liquid crystal monitor 20 (or the liquid crystal viewfinder 8 in the case of viewfinder imaging mode). Consequently, the user can perform framing or imaging while looking at a live image in a state in which the interchangeable lens unit 2 has been completely mounted to the camera body 3, and ordinary imaging is possible only when the mounting state is complete.

The four states shown in FIGS. 16A to 16D, for example, are possible as the "mounting state of the interchangeable lens unit 2 with respect to the body mount 4." Of these, "when the mounting state of the interchangeable lens unit 2 is incomplete" refers to the states shown in FIGS. 16A to 16C (excluding FIG. 16D).

(2) When the mounting detector 10d detects the start of mounting or the start of removal of the interchangeable lens unit 2, the image display controller 21 prohibits display of the subject as a live image on the liquid crystal monitor 20. More specifically, the image display controller 21 switches the display of the liquid crystal monitor 20 from a live image display state to a display stopped state. That is, when the mounting or removal of the interchangeable lens unit 2 is started, nothing is displayed on the liquid crystal monitor 20. Accordingly, accidental imaging can be more effectively prevented from happening when the mounting state of the interchangeable lens unit 2 is incomplete.

(3) If the mounting detector 10d detects that the interchangeable lens unit 2 is in the midst of being mounted to the body mount 4, the image display controller 21 prohibits the display of the subject as a live image on the liquid crystal monitor 20. More specifically, the liquid crystal monitor 20 is controlled by the image display controller 21 so that the display stopped state is continued. Accordingly, accidental imaging can be more effectively prevented from happening when the mounting state of the interchangeable lens unit 2 is incomplete.

(4) If the mounting detector 10d detects that the interchangeable lens unit 2 has been removed from the body mount 4, then the image display controller 21 prohibits the display of the subject as a live image on the liquid crystal monitor 20. More specifically, the liquid crystal monitor 20 is controlled by the image display controller 21 so that the display stopped state is continued. Consequently, accidental imaging can be more effectively prevented from happening when the mounting state of the interchangeable lens unit 2 is incomplete.

(5) Since the mounting detector 10d detects the mounting state of the interchangeable lens unit 2 with respect to the body mount 4 on the basis of the detection result of the lock pin detector 10g and the lens detector 10h, the four mounting states shown in FIGS. 16A to 16D can be detected, and the liquid crystal monitor 20 or the viewfinder 38 can be controlled so as to produce the display state best suited to the mounting state. This reduces power consumption and allows the user to be kept informed.

(6) Whether the interchangeable lens unit 2 is in the midst of being mounted or in the midst of being removed, when the display button 37 is pressed, the subject is displayed as a live image on the liquid crystal monitor 20, regardless of the detection result of the mounting detector 10d. Therefore, basically imaging is prevented when the mounting state of the interchangeable lens unit 2 is incomplete, and even if the user should try and fail to mount an incompatible interchangeable lens unit to the camera body 3, imaging can be carried out forcibly using a special interchangeable lens unit, which makes the camera body 3 more convenient to use.

Conceivable cases in which there is incompatibility between the interchangeable lens unit and the camera body here include when the interchangeable lens unit and the camera body conform to different standards, and when the mounted interchangeable lens unit is one made by the user, for example.

(7) Sine the correction decision section 10e decides whether or not an image will be subjected to distortion correction processing by the correction processor 23 on the basis of the detection result of the mounting detector 10d, this prevents the display of an image that has not undergone distortion correction processing in the course of mounting the interchangeable lens unit 2, for example. This prevents the user from seeing an image that has not undergone distortion correction processing, which could look strange to the user.

Second Embodiment

In the above embodiment, basically nothing is displayed on the liquid crystal monitor 20 in the course of mounting the interchangeable lens unit 2, but a warning to the user may be displayed on the liquid crystal monitor 20, for example.

Figure 18A:
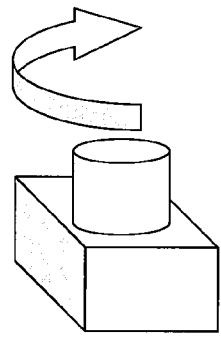
FIGS. 18A and 18B are warning display examples.
Figure 18B:
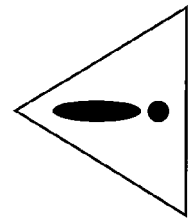

For instance, in step S10 shown in FIG. 17, it is possible for a warning such as that shown in FIGS. 18A and 18B to be displayed on the liquid crystal monitor 20 rather than switching to the display stopped state.

In this case, the user can tell right away that the mounting state of the interchangeable lens unit 2 is incomplete. Accordingly, the camera is easy to use even for a user unaccustomed to digital cameras with an interchangeable lens.

FIGS. 18A and 18B are display examples, and what is displayed may be something else, as long as it is information related to the mounting of the interchangeable lens unit.

Third Embodiment

In the above embodiment, a live image is displayed forcibly on the liquid crystal monitor 20 on the basis of operation of the display button 37, but the constitution may be such that no live image or the like is displayed at all.

Figure 19:
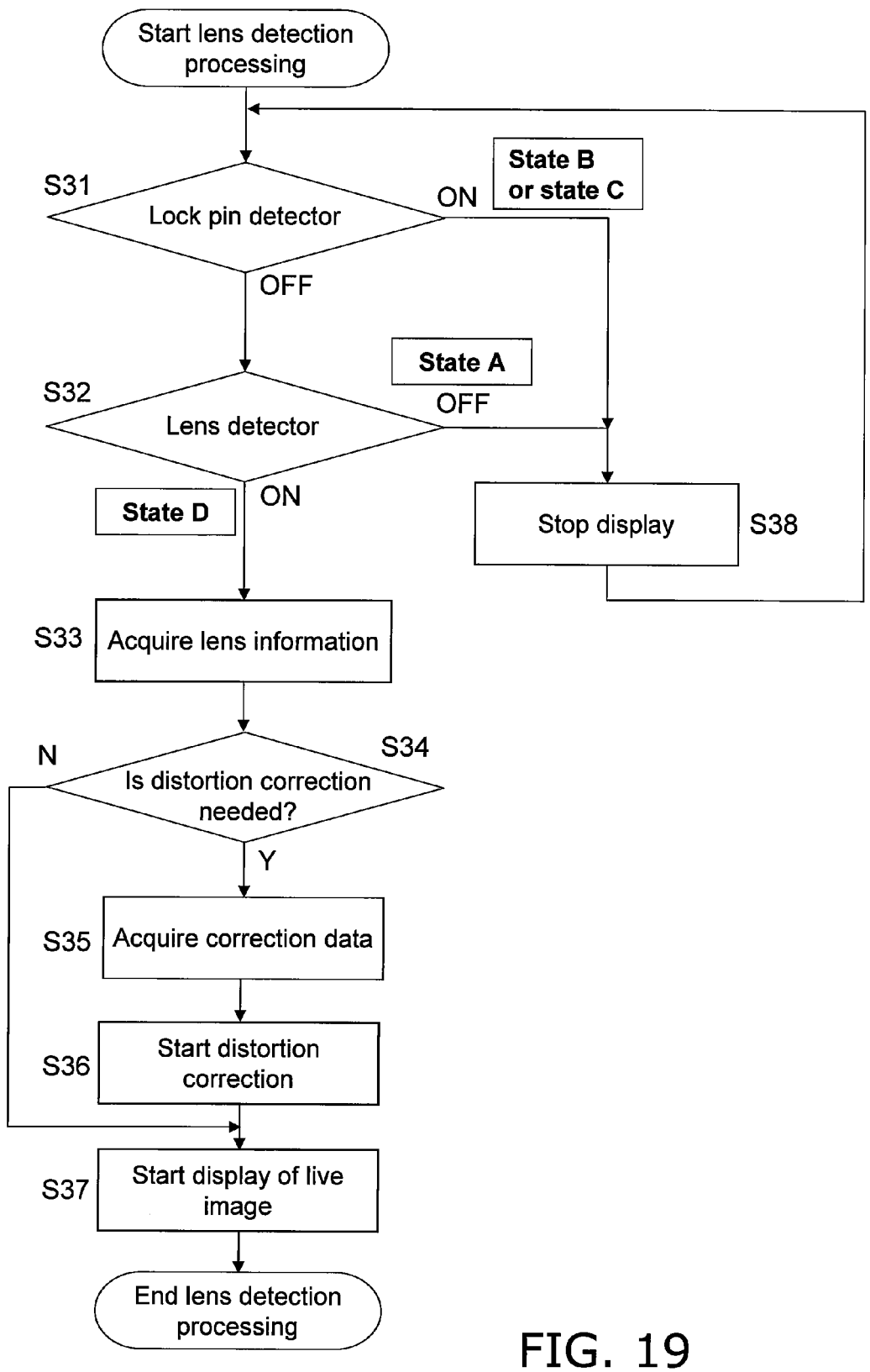
FIG. 19 is a flowchart of lens detection processing (third embodiment).

For instance, as shown in FIG. 19, the state of the lock pin 99a is checked by the body microcomputer 10 (S31). If the lock pin 99a has been pushed in, the display state of the liquid crystal monitor 20 is switched from a specific display state (an example of a first display state) to a display stopped state (an example of a second display state) (S38). If the lock pin 99a has not been pushed in, then if the body-side terminal 4a is not touching the lens-side terminal 95a, a state in which nothing at all is displayed on the liquid crystal monitor 20 is maintained (S32, S38).

If the lock pin 99a has not been pushed in, and the body-side terminal 4a is touching the lens-side terminal 95a, then just as in the above-mentioned steps S3 to S7, lens information is acquired, data for distortion correction is acquired, and distortion correction processing and live image display are performed (S33 to S37).

In this case, the image is displayed on the liquid crystal monitor 20 for a shorter time and power consumption can be reduced as compared to the above embodiments.

Other Embodiments

Embodiments of the present invention are not limited to those given above, and various changes and modifications are possible without departing from the gist of the invention. Also, the above embodiments are essentially preferred examples, and are not intended to limit the present invention, its applications, or the scope of those applications.

(1) In the above embodiments, the digital camera is capable of capturing both still pictures and moving pictures, but may instead be capable of capturing just still pictures or just moving pictures.

(2) The digital camera 1 above has no quick return mirror, but a quick return mirror may be installed as in a conventional single lens reflex camera.

Also, the camera body 3 is compatible with only a contrast detection method, but may instead be compatible with phase detection in addition to contrast detection.

(3) The configuration of the optical system L is not limited to that in the above embodiments. For example, the third lens group G3 may be made up of a plurality of lenses, and the second lens group G2 may be made up of a single lens.

(4) In the above embodiments, the exposure time of the imaging sensor 11 is controlled by operating the shutter unit 33, but the exposure time of the imaging sensor 11 may instead be controlled by an electronic shutter.

(5) In the above embodiments, the electronic tracking was performed by the lens microcomputer 40, but a command may be sent from the body microcomputer 10 to the lens microcomputer 40, and the control of the electronic tracking performed on the basis of this command.

In the above first to third embodiments, in a state other than one in which the interchangeable lens unit 2 is completely mounted (that is, in states A to C), basically the liquid crystal monitor 20 is switched to a display stopped state, and a live image is displayed on the liquid crystal monitor 20 under specific conditions (an example of a third display state).

However, the second display state may be a display state other than one in which a live image is displayed. For example, in step S10 in FIG. 17 and step S38 in FIG. 19, a setting screen on which various setting values are displayed, a menu screen, or a reproduction mode screen may be displayed on the liquid crystal monitor 20. In reproduction mode, the image recorded to an image recorder 18 can be viewed.

INDUSTRIAL APPLICABILITY

With the technology discussed above, a camera body and an imaging device can be provided with which the mounting state of an interchangeable lens unit can be easily checked by the user. Accordingly, the technology discussed above is favorable for interchangeable lens digital cameras and other such imaging devices.

REFERENCE SIGNS LIST 1 digital camera (an example of an imaging device)
2 interchangeable lens unit
3 camera body
3a housing
4 body mount (an example of a mounting component)
4a body-side terminal
10 body microcomputer (an example of a display controller, an example of a mounting determination component, an example of a correction decision section, and an example of an information acquisition section)
10a memory
10d mounting detector
10e correction decision section
10f correction information acquisition section
10g lock pin detector (an example of a first detector)
10h lens detector (an example of a second detector)
20 liquid crystal monitor (an example of a display section)
21 image display controller (an example of a display controller)
37 display button (an example of a display operating component)
40 lens microcomputer
95 lens mount
95a lens-side terminal
95b lock hole
97 switch
99 lens removal button (an example of a lens removal operating component)
99a lock pin
L optical system
G1 first lens group
G2 second lens group
G3 third lens group
G4 fourth lens group
L5 fifth lens
L6 sixth lens
L7 seventh lens

The invention claimed is:

1. A camera body to which an interchangeable lens unit configured to form an optical image of a subject can be mounted, the camera body comprising:
   a housing;
   a mounting component fixed to the housing, the mounting component to which the interchangeable lens unit can be mounted;
   an imaging element housed in the housing and configured to convert the optical image of the subject into an image signal;
   a display section configured to display the subject as an image on the basis of the image signal acquired by the imaging element;
   a mounting detector configured to detect the mounting state of the interchangeable lens unit with respect to the mounting component;
   a display controller that restricts the display of the subject as a live image on the display section when the mounting detector has detected that the mounting state of the interchangeable lens unit is incomplete; and
   a lens removal operating component configured to be operated to remove the interchangeable lens unit, wherein
   the mounting detector has a first detector configured to detect the state of operation of the lens removal operating component, and a second detector configured to detect that the interchangeable lens unit has been disposed at a specific position with respect to the mounting component, and
   the mounting detector detects the mounting state of the interchangeable lens unit with respect to the mounting component on the basis of the detection results of the first detector and second detector.

2. The camera body according to claim 1, wherein the display controller restricts the display of the subject as a live image on the display section when the mounting detector has detected that the interchangeable lens unit has been removed from the mounting component.

3. The camera body according to claim 1, wherein the display controller restricts the display of the subject as a live image on the display section when the mounting detector has detected that the interchangeable lens unit is in the midst of being mounted to the mounting component.

4. The camera body according to claim 1, wherein the display controller restricts the display of the subject as a live image on the display section when the mounting detector has detected either the start of mounting or the start of removing the interchangeable lens unit with respect to the mounting component.

5. The camera body according to claim 1, wherein the display controller permits the display of the subject as a live image on the display section when the mounting detector has detected that the interchangeable lens unit has been completely mounted to the mounting component.

6. The camera body according to claim 1, further comprising
a display operating component configured to be operated to adjust the display state of the display section, wherein
the display controller displays the subject as a live image on the display section when the display operating component has been operated, regardless of the detection result of the mounting detector.

7. The camera body according to claim 1, wherein the display controller displays the subject as a live image on the display section after a specific time has elapsed since the mounting detector has detected either the start of mounting or the start of removing the interchangeable lens unit with respect to the mounting component, regardless of the detection result of the mounting detector.

8. The camera body according to claim 1, further comprising:
a correction information acquisition section configured to acquire distortion correction information had by the interchangeable lens unit;
a correction processor configured to subject the image signal to distortion correction processing on the basis of the distortion correction information; and
a correction decision section configured to decide whether or not to subject the image signal to the distortion correction processing on the basis of the detection result of the mounting detector.

9. The camera body according to claim 1, wherein
a mirror is not disposed between the mounting component and the imaging element.

10. An imaging device, comprising:
an interchangeable lens unit having an optical system; and the camera body according to claim 1.

11. The camera body according to claim 2, wherein
the display controller restricts the display of the subject as a live image on the display section when the mounting detector has detected that the interchangeable lens unit is in the midst of being mounted to the mounting component.

12. The camera body according to claim 2, wherein
the display controller restricts the display of the subject as a live image on the display section when the mounting detector has detected either the start of mounting or the start of removing the interchangeable lens unit with respect to the mounting component.

13. The camera body according to claim 2, wherein
the display controller permits the display of the subject as a live image on the display section when the mounting detector has detected that the interchangeable lens unit has been completely mounted to the mounting component.

14. The camera body according to claim 2, further comprising
a display operating component configured to be operated to adjust the display state of the display section, wherein
the display controller displays the subject as a live image on the display section when the display operating component has been operated, regardless of the detection result of the mounting detector.

15. The camera body according to claim 2, wherein
the display controller displays the subject as a live image on the display section after a specific time has elapsed since the mounting detector has detected either the start of mounting or the start of removing the interchangeable lens unit with respect to the mounting component, regardless of the detection result of the mounting detector.

16. The camera body according to claim 2, further comprising:
a correction information acquisition section configured to acquire distortion correction information had by the interchangeable lens unit;
a correction processor configured to subject the image signal to distortion correction processing on the basis of the distortion correction information; and
a correction decision section configured to decide whether or not to subject the image signal to the distortion correction processing on the basis of the detection result of the mounting detector.

17. The camera body according to claim 2, wherein
a mirror is not disposed between the mounting component and the imaging element.

18. The camera body according to claim 3, wherein
the display controller restricts the display of the subject as a live image on the display section when the mounting detector has detected either the start of mounting or the start of removing the interchangeable lens unit with respect to the mounting component.

* * * * *